United States Patent [19]

Kawaguchi et al.

[11] 4,265,745

[45] May 5, 1981

[54] PERMSELECTIVE MEMBRANE

[75] Inventors: Takeyuki Kawaguchi; Yutaka Taketani; Yuzuru Hayashi; Tomoyoshi Ono; Koh Mori, all of Iwakuni, Japan

[73] Assignee: Teijin Limited, Osaka, Japan

[21] Appl. No.: 907,194

[22] Filed: May 18, 1978

[30] Foreign Application Priority Data

| | | | |
|---|---|---|---|
| May 25, 1977 | [JP] | Japan | 52/59930 |
| May 27, 1977 | [JP] | Japan | 52/60944 |
| Sep. 13, 1977 | [JP] | Japan | 52/109401 |

[51] Int. Cl.[3] .......... B01D 13/00

[52] U.S. Cl. .......... 210/654; 210/491; 210/500.2; 264/45.5

[58] Field of Search .......... 428/413, 414; 260/37 EP, 29.2 EP; 210/520 M, 490, 491, 23 H, 321 B; 264/45.5, 48; 427/244, 245, 246

[56] References Cited

U.S. PATENT DOCUMENTS

| | | | |
|---|---|---|---|
| 3,218,273 | 11/1965 | Montesaho | 260/37 EP X |
| 3,556,305 | 1/1971 | Shorr | 210/490 |
| 3,567,631 | 3/1971 | Lukach et al. | 210/49 UX |
| 3,947,338 | 3/1976 | Jerabek et al. | 260/29.2 EP X |
| 3,950,247 | 4/1976 | Chiang et al. | 210/23 R |
| 3,951,815 | 4/1976 | Wrasidlo | 210/500 M |
| 4,005,012 | 1/1977 | Wrasidlo | 210/23H |
| 4,039,440 | 8/1977 | Cadotte | 210/500 M |

*Primary Examiner*—Frank A. Spear, Jr.
*Attorney, Agent, or Firm*—Sherman & Shalloway

[57] ABSTRACT

A permselective membrane comprising a thin permselective film of a polymeric material, said polymeric material being prepared by cross-linking a polyaddition product between a polyepoxy compound and a polyamino compound having at least two amino groups capable of reacting with epoxy groups with a polyfunctional compound selected from the group consisting of aromatic, heterocyclic and alicyclic compounds containing at least two functional groups selected from acid halide, sulfonyl halide, isocyanate and acid anhydride groups; and a process for producing the same. The permselective membrane of this invention is especially useful for desalination of saline or brackish water by reverse osmosis.

43 Claims, No Drawings

PERMSELECTIVE MEMBRANE

BACKGROUND OF THE INVENTION

1. Field of the Invention

This invention relates to a novel permselective membrane, and more specifically, to a permselective membrane consisting basically of an amine-modified epoxy polymer and having high performance, especially superior water permeability and good flexibility, a process for its production, and to the use of the membrane in reverse osmosis.

The permselective membrane is a membrane which has selective permeability to specified molecules. It is frequently used to remove very small amounts of contaminated molecules dissolved or diffused in a liquid or gas.

2. Discussion of the Prior Art

In recent years, reverse osmosis has attracted great deal of interest for utilization in fields involving purification of liquids. This is of especial importance when utilizing this system in the purification of water and brackish water. Likewise, the process is also used to remove impurities from liquids such as water or, in the fields of dialysis, e.g. blood dialysis. When utilizing reverse osmosis in the purification of brackish water, a pressure in excess of the osmotic pressure of the brackish water feed solution is applied to the feed solution which is separated from purified water by a semipermeable membrane. Pure water thereby diffuses through the membrane while the sodium chloride molecules or other impurities which may be present in the brackish water are retained by the membrane.

The efficiency of the reverse osmosis method is greatly affected by the properties of the permselective membrane used. Much effort has therefore been made to develop membranes having high performance, and this effort has resulted in some specific suggestions.

For example, U.S. Pat. Nos. 3,133,132 and 3,133,137 disclose the early Loeb-type membranes made of cellulose diacetate. These membranes are asymmetric membranes which are characterized by a very thin, dense surface layer or skin that is supported upon an integrally attached, much thicker supporting layer. These known membranes based on cellulose diacetate have the defect of poor compaction, low resistance to chemical and biological degradation, a short useful life, and insufficient flux and salt rejection characteristics.

In an attempt to overcome these defects of the Loeb-type membranes, some membranes composed basically of synthetic polymers have recently been suggested. For example, U.S. Pat. No. 3,951,815 discloses a composite semipermeable membrane comprising a microporous substrate and an ultrathin film formed of a cross-linked, grafted polyethylenimine disposed on one surface of said microporous substrate that has been cross-linked with a di- or tri-functional compound such as isophthaloyl chloride and grafted with a graft reactant such as acrylonitrile or epichlorohydrin. U.S. Pat. No. 4,005,012 describes a composite semipermeable membrane comprising an ultrathin film formed by contacting an amine-modified polyepihalohydrin with a polyfunctional agent on a microporous substrate to form this film on one surface of the microporous substrate. Also, U.S. Pat. No. 4,039,440 discloses a reverse osmosis membrane prepared in situ on a porous support by initial formation of a layer of polyethylenimine on the support, followed by interfacial reaction with a polyfunctional reagent to produce a thin surface coating which possesses salt barrier characteristics.

The membrane composed basically of crosslinked polyethyleneimine disclosed in U.S. Pat. No. 4,039,440 has a high salt rejection, but has the defect of insufficient water flux and low oxidation resistance (e.g., low resistance to deterioration by the presence of chlorine in the feed saline or brackish water). As one method of improving the oxidation resistance, U.S. Pat. No. 3,951,815 suggests the grafting of acrylonitrile to the polyethyleneimine. The acrylonitrile-grafted and crosslinked polyethyleneimine shows some improvement in oxidation resistance, but suffers from the serious defect of markedly reduced water flux.

The membrane composed basically of the amine-modified polyepihalohydrin disclosed in U.S. Pat. No. 4,005,012 exhibits a high salt rejection but its water flux is not sufficient. It has been strongly desired to develop membranes having a higher water flux.

The characteristics required of permselective membranes are basically high permselectivity and a high flux. In addition, they should have high resistance to compaction, superior resistance to chemical and biological degradation, and sufficient flexibility to endure shaping into modules in actual use such as a tube, spiral or hollow filament. The membranes so far suggested lack one or more of these characteristics, and are not entirely satisfactory for use as permselective membranes.

Accordingly, the art has strongly desired to develop membranes having a combination of the aforesaid desired characteristics.

OBJECTS AND SUMMARY OF THE INVENTION

It is an object of this invention to provide a permselective membrane which is free from the defects of conventional reverse osmosis membranes.

Another object of this invention is to provide a permselective membrane having high permselectivity and flux, superior flexibility and high resistance to compaction and high resistance to chemical and biological degradation.

Still another object of this invention is to provide a composite permselective membrane having high permselectivity and flux, especially a very high flux, superior flexibility, high resistance to compaction and high resistance to chemical and biological degradation.

Yet another object of this invention is to provide a process for producing a composite permselective membrane having high permselectivity and flux, superior flexibility, high resistance to compaction and high resistance to chemical and biological degradation.

A further object of this invention is to provide a method for using the aforesaid permselective membrane for the reverse osmosis desalination of a saline or brackish water.

Other objects and advantages of this invention will become apparent from the following description.

DETAILED DESCRIPTION AND PREFERRED EMBODIMENTS

According to this invention, there is provided a permselective membrane comprising a thin permselective film of a polymeric material, said polymeric material being prepared by cross-linking a polyaddition product between a polyepoxy compound and a polyamino compound having at least two amino groups capable of reacting with epoxy groups with a polyfunctional compound selected from the group consisting of aromatic, heterocyclic and alicyclic compounds containing at least two functional groups selected from acid halide groups, sulfonyl halide groups, isocyanate groups and acid anhydride groups.

The characteristic feature of the present invention lies in the use of a specified polymeric material derived from a polyepoxy compound, which has not been used in the art as a material for permselective membranes. The polymeric material from which the permselective membrane of the invention is prepared is obtained by crosslinking with a specified polyfunctional compound a polyaddition product between a polyepoxy compound and a polyamine compound containing per molecule at least two amino groups capable of reacting with epoxy groups.

The polyepoxy compound used to produce the polyaddition product is a compound having at least two epoxy groups

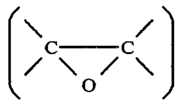

per molecule. The polyepoxy compound may be low molecular or high molecular, and linear or branched. It may also contain an aromatic, heterocyclic or alicyclic ring. The structural moiety of the polyepoxy compound excluding the epoxy groups may contain a hetero atom such as oxygen, nitrogen, sulfur or halogen.

The number of epoxy groups present in the polyepoxy compound is at least two, and no special upper limit exists. However, in terms of "epoxy equivalent", the number is generally not more than 500, preferably not more than 350, and more preferably 200 to 40.

The term "epoxy equivalent", as used in the present specification and the appended claims, denotes the reciprocal of the equivalents of epoxy groups contained per gram of an epoxy compound, and can be measured by a known determination method (for example, the HCl-pyridine titration method).

Desirably, the two or more epoxy groups of the polyepoxy compound are not spaced from one another too far. It is advantageous that the number of carbon atoms constituting the chain connecting two adjacent epoxy groups in the same molecule is generally not more than 50, preferably not more than 30, and more preferably not more than 15.

The molecular weight of the polyepoxy compound is not critical, and ranges broadly from a high molecular weight to a low molecular weight. From the standpoint of availability and handleability, the polyepoxy compound generally has a molecular weight of not more than 2000, preferably not more than 1000, and advantageously 50 to 500.

The polyepoxy compound that can be used in this invention can be selected from those which are generally known in the field of epoxy resins so long as they have the aforesaid characteristics. Typical examples are shown below. It should be understood however that the following exemplification is not intended to limit the scope of the invention, and other polyepoxy compounds obvious to those skilled in the art can equally be used in this invention.

(A) ALIPHATIC POLYEPOXY COMPOUNDS

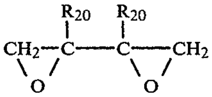 ($R_{20}$ = —H or —$CH_3$),

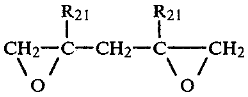 ($R_{21}$ = —H or $CH_3$),

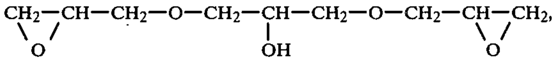

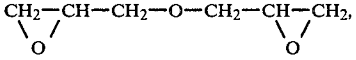

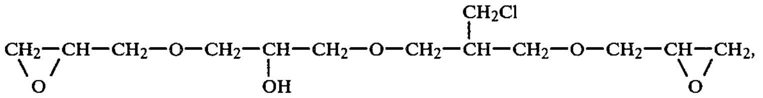

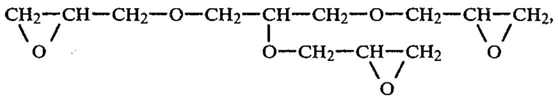

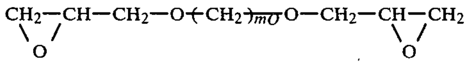 ($m_O$ = 3-10),

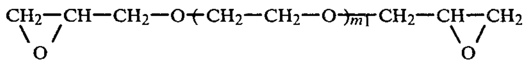 ($m_1$ = 1-10),

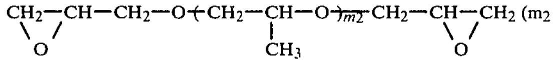 ($m_2$ = 1-10),

-continued
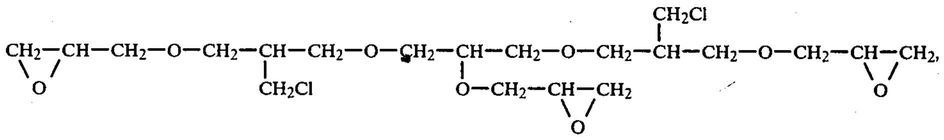
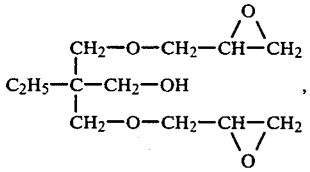
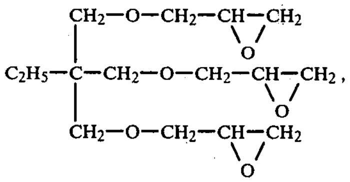
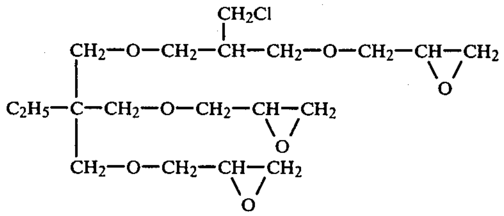
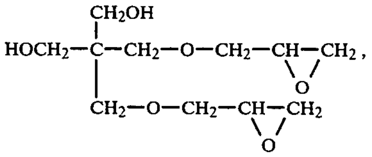
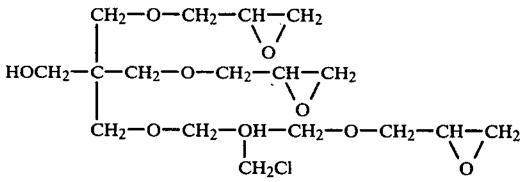
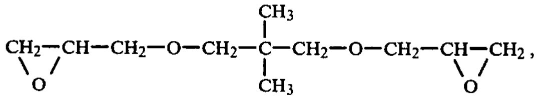
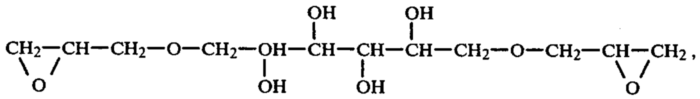
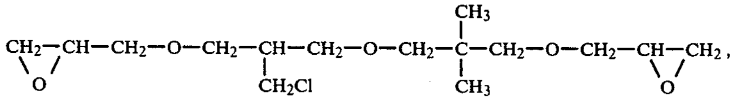
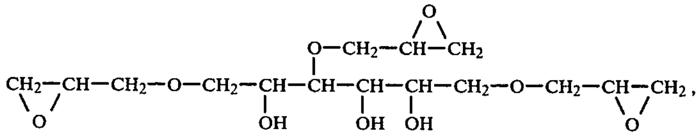
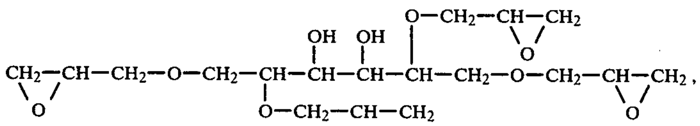
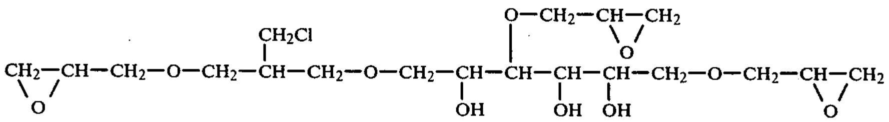

-continued (B) Alicyclic polyepoxy compounds

Vinylcyclohexene dioxide

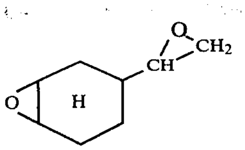

Limonene dioxide

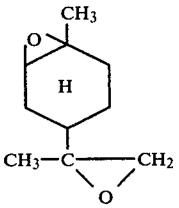

Bis(2,3-epoxy)cyclopentyl ether

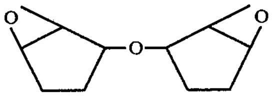

1,2-Divinylcyclobutane dioxide

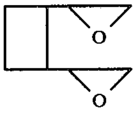

2-Glycidyloxy-5-glycidyl dioxane

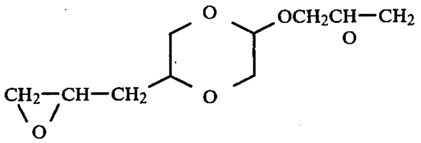

N,N-Di-(3,4-epoxycyclohexylmethyl)alkylamine

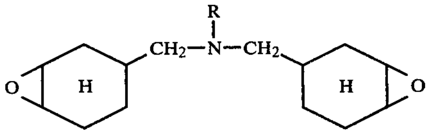

(R = $C_1$—$C_3$ alkyl)

2,2-(4,4'-Diglycidyloxy)dicyclohexyl propane

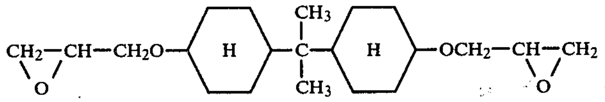

1,2-Di-[5',6'-epoxytetrahydroisoindole-1',3'-dione-2'-yl]ethane

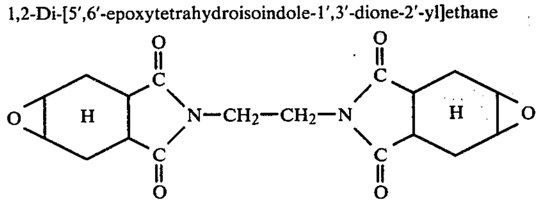

Dicyclopentadiene dioxide

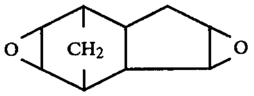

(C) Aromatic polyepoxy compounds

Resorcinol diglycidyl ether
Hydroquinone diglycidyl ether
Pyrogallol diglycidyl ether

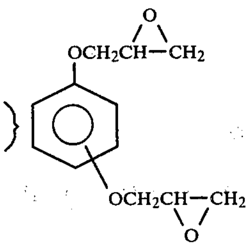

-continued

2-Glycidyl phenyl glycidyl ether

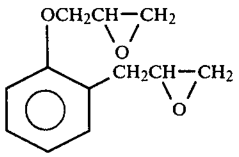

2,6-Diglycidyl phenyl glycidyl ether

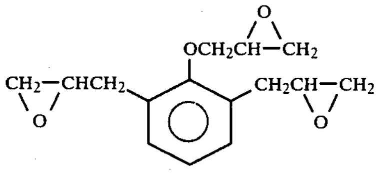

Divinylbenzene dioxide

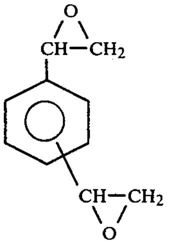

2,2-Bis[(4'-glycidyloxy)phenyl]propane

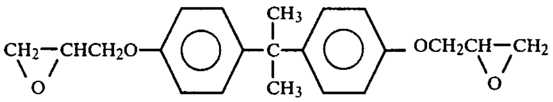

(4,4'-diglycidyloxy)diphenyl methane

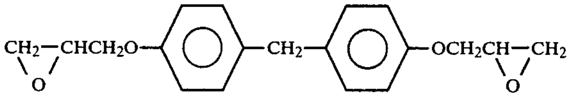

(4,4'-diglycidyloxy)diphenyl ether

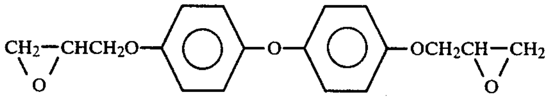

(4,4'-diglycidyloxy)diphenyl sulfone

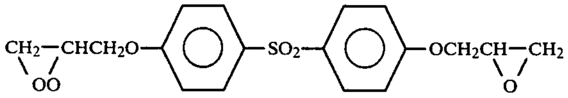

Phenol novolak-epoxy resin

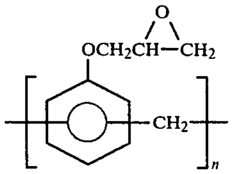

(D) Heterocyclic polyepoxy compounds

Triglycidyl isocyanurate

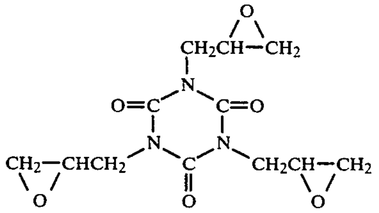

N,N-Diglycidyl hydantoin

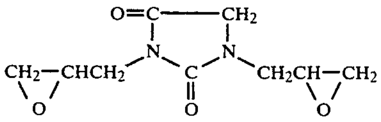

N,N-Diglycidyl-5,5-dimethylhydantoin

-continued

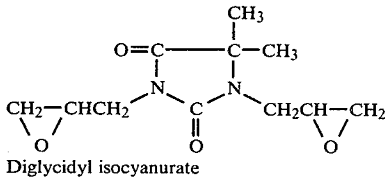

Diglycidyl isocyanurate

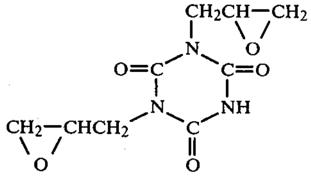

2,4,6-Tri(glycidyloxyl benzylamino)-1,3,5-triazine

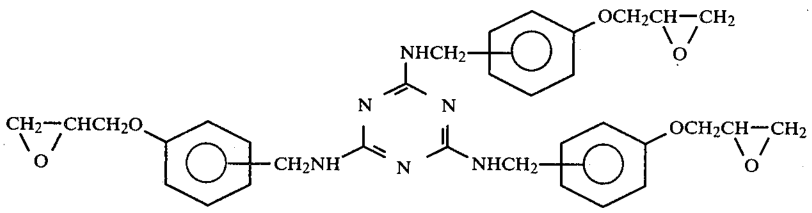

These polyepoxy compounds described above can be used either alone or as mixtures of two or more.

Suitable polyepoxy compounds that can be used in this invention are those having at least two glycidyl groups

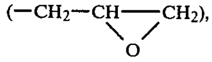

specifically polyglycidyl compounds of the general formula

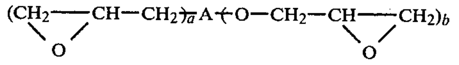 (V)

wherein A represents an organic residue having not more than 30 carbon atoms and a valence of (a+b), a and b are integers of 0 to 6, and a+b is 2 to 6; or A represents a direct bond and a and b are both 1.

Of these, especially preferred are polyepoxy compounds of the formula $$R_1 -\!\!(Q-CH_2-CH-CH_2)_m \qquad (II)$$

wherein Q represents an oxygen or a direct bond;

(i) when Q represents an oxygen atom, $R_1$ represents a substituted or unsubstituted hydrocarbon group containing up to 30 carbon atoms and having a valence of m, optionally containing an ether linkage, and m is an integer of 2 to 4;

(ii) when Q represents a direct bond $R_1$ is the group of the formula

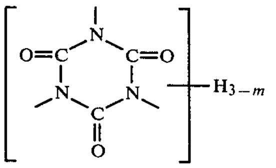

and m is 2 or 3, or $R_1$ is the group of the formula

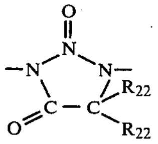

in which $R_{22}$ is a hydrogen atom or a methyl group and m is 2.

The organic residue represented by symbol A in formula (V) may have a linear structure, a cyclic structure or a combination of these, and may contain hetero atoms such as an oxygen, nitrogen, halogen or sulfur atom in addition to carbon and hydrogen atoms in the above structure. Suitable organic residues contain not more than 30, preferably not more than 20, and more preferably 15 to 2, carbon atoms. Examples of such organic residues are aliphatic groups, alicyclic groups, aromatic groups, heterocyclic groups, araliphatic groups, and heterocyclic-aliphatic groups having a valence of (a+b). These groups may contain at least one substituent such as hydroxyl, halogen or halomethyl, or an ether linkage.

The hydrocarbon group optionally containing an ether linkage which is expressed by symbol B in formula (II) may also have a linear structure, a cyclic structure or a combination of these, and suitably has not more than 30 carbon atoms, preferably not more than 20 carbon atoms, especially 15 to 2 carbon atoms. Examples of such a hydrocarbon group include saturated aliphatic hydrocarbon groups having a valence of 2 to 6 and containing 2 to 10, especially 2 to 6, carbon atoms, such as $-(CH_2)_2-$, $-(CH_2)_3-$, 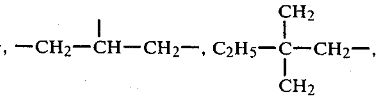

-continued

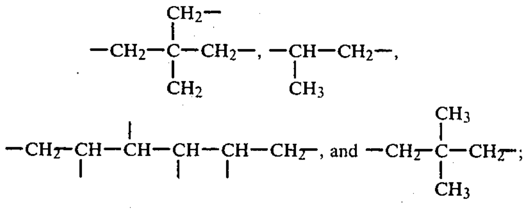

divalent or trivalent aromatic groups having 6 to 10 carbon atoms such as

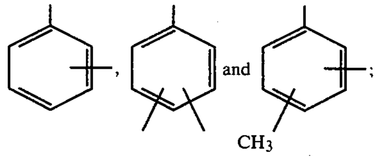

and divalent bisphenol derivative residues such as

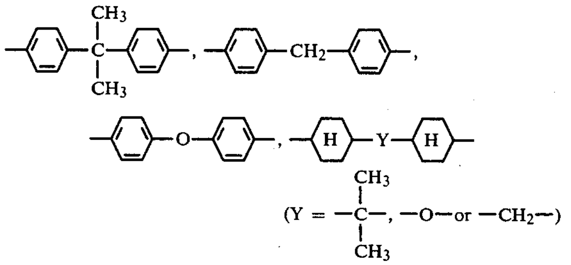

and hydrogenated bisphenol derivative residues. This hydrocarbon group may have one or more substituents. Typical examples of the substituents include halogen atoms, halomethyl groups, lower alkoxy groups and a hydroxyl group. Desirably, the number of these substituents is not more than 6, especially 1 to 4. Specific examples of the hydrocarbon group $R_1$ in formula (II) optionally containing an ether linkage are

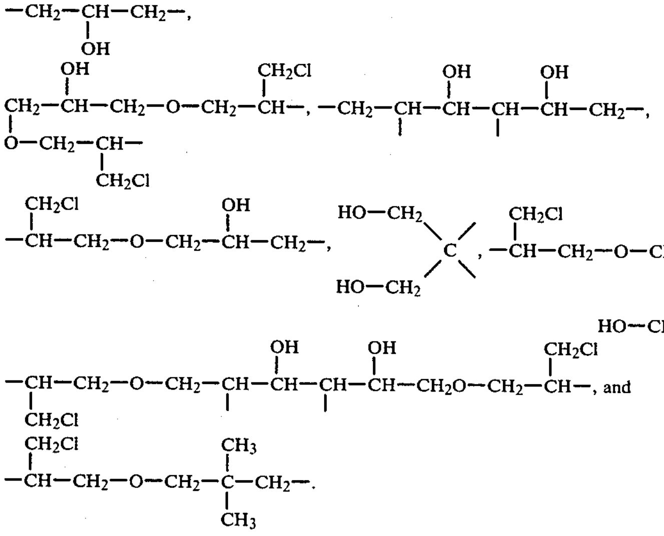

The term "lower", as used in the present specification and appended claims to qualify groups or radicals, means that groups or radicals modified by this term contain not more than 4, preferably not more than 2, carbon atoms.

The polyepoxy compounds having such substituents can be prepared, for example, by condensation reaction between polyhydroxy compounds and epihalohydrins as schematically shown below.

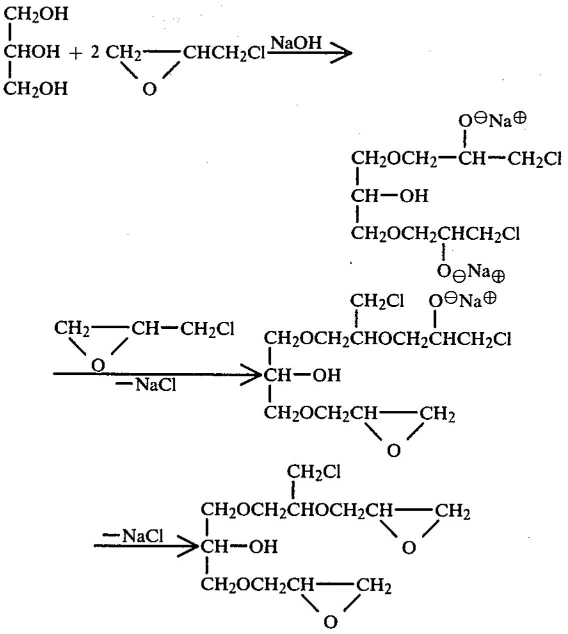

Ordinary commercialized polyepoxy compounds prepared by such a method oftentimes contain a halomethyl group, and its content can be known by determining the halogen content (frequently the chlorine content) and epoxy equivalent.

Typical examples of the group of polyepoxy compounds which can be used especially advantageously in the present invention are polyepoxy compounds of formula (II) which are obtained by condensing polyhydroxy compounds selected from ethylene glycol, propylene glycol, glycerol, trimethylolpropane, sorbitol, pentaerythritol, diglycerol, neopentyl glycol, resorcinol, hydroquinone, pyrogallol, phloroglucinol, 2,2-(4,4'-dihydroxy)diphenylpropane, 4,4'-dihydroxydiphenyl ether and 4,4'-dihydroxydiphenylmethane with epihalohydrins, and mixtures of two or more of these polyepoxy compounds. They may contain one or more substituents such as hydroxyl or halomethyl in the molecule.

Typical examples of another group include diglycidyl isocyanurate, triglycidyl isocyanurate, diglycidyl hydantoin, and mixtures of two or more of these.

When the polyepoxy compounds are used in the form of a mixture, the mixing ratio of the polyepoxy compounds is not critical, and it is selected so that the total epoxy equivalent of the mixture will be within the above-specified range.

It has been found surprisingly that when a mixture of triglycidyl isocyanurate of the following formula

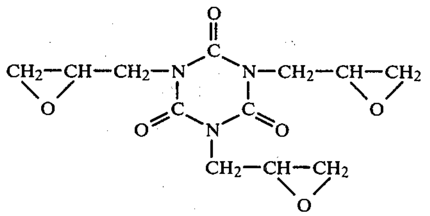

and a polyglycidyl ether compound of the following formula

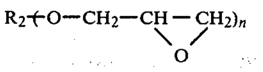

(III)

wherein $R_2$ represents a substituted or unsubstituted hydrocarbon group containing not more than 15 carbon atoms and having a valence of n which optionally contains an ether linkage, and n is an integer of 2 to 4, is used in accordance with this invention, a membrane having more improved salt rejection and/or flux properties can be formed. Symbol $R_2$ in formula (III) has the same meaning as the hydrocarbon group optionally containing an ether linkage which has been described hereinabove with regard to symbol $R_1$ in formula (II).

In this mixture, the ratio between the triglycidyl isocyanurate and the polyglycidyl ether compound of formula (III) is not critical, and can be varied widely according to the characteristics required of the final desired membrane. It is advantageous that the weight ratio of triglycidyl isocyanurate to the polyglycidyl ether of formula (III) is generally 10:1 to 1:5, preferably 7:1 to 1:2, especially 5:1 to 1:1.

Examples of the polyepoxy compounds of formula (III) include the polyepoxy compounds of formula (II) which are obtained by the condensation reaction of epihalohydrins with polyhydroxy compounds of the group consisting of ethylene glycol, propylene glycol, glycerol, trimethylol propane, sorbitol, pentaerythritol, diglycerol, neopentyl glycol, resorcinol, hydroquinone, pyrogallol, phloroglucinol, 2,2-(4,4'-dihydroxy)diphenyl propane, 4,4'-dihydroxydiphenyl ether and 4,4'-dihydroxydiphenyl methane, and mixtures of two or more of these. These polyepoxy compounds may contain a substituent such as a hydroxyl or halomethyl group in the molecule.

Specific examples of the polyepoxy compounds of formula (III) are glycerol diglycidyl ether, glycerol triglycidyl ether, trimethylolpropane diglycidyl ether, trimethylolpropane triglycidyl ether, sorbitol diglycidyl ether, surbitol triglycidyl ether, sorbitol tetraglycidyl ether, phenylene diglycidyl ether, benzenetolyl triglycidyl ether, bisphenol A diglycidyl ether, derivatives of these compounds resulting from the substitution of the whole or a part of their glycidyl groups and/or the hydrogen atoms of their hydroxyl groups by a β-halomethyl or β-glycidyloxyethyl group, and mixtures of two or more of these.

The polyamino compound to be used to form polyadducts with the polyepoxy compound is an organic compound containing at least two amino groups capable of reacting with epoxy groups. The term "amino groups capable of reacting with epoxy groups" denotes amino groups containing one or two active hydrogen atoms bonded to nitrogen atoms, that is primary amino groups ($-NH_2$) or secondary amino groups $$(-\overset{H}{N}-$$

which is also called an imino group). These amino groups may sometimes be referred to hereinbelow as "reactive amino groups".

The polyamino compound used in this invention is not particularly limited in its type so long as it contains at least two of primary amino groups, secondary amino groups, or both per molecule. It may range from a low-molecular-weight compound to a high-molecular-weight compound, and may be linear or branched. It may further contain an aromatic ring, heterocyclic ring or alicyclic ring. The structural moiety of the polyamino compound excluding the reactive amino groups may contain hetero atoms such as oxygen and sulfur in addition to carbon and hydrogen atoms. The reactive amino groups can be present at the ends or sides chains of the molecular chain, and secondary amino groups may be incorporated in the molecular chain.

The number of the primary and secondary amino groups that can be present in the polyamino compound may be at least two, and no strict upper limit is set up. However, from the standpoint of the characteristics, especially salt rejection, of the resulting membrane, the polyamino compound suitably has an "amino equivalent" of generally 10 to 40 mulliequivalents (to be abbreviated as "meq") per gram of the polyamino compound, preferably 15 to 35 meq/g, especially preferably 20 to 30 meq/g.

The term "amino equivalent", as used in the present specification and the appended claims, denotes the sum of the equivalents of primary and secondary amino groups contained per gram of the polyamino compound. The sum of the equivalents of the primary and secondary amino groups can be determined generally by a known determination method (such as the perchloric acid-glacial acetic acid method, or the azomethine method).

Desirably, the two or more reactive amino groups present in the polyamino compound should not be spaced from one another too far. It is advantageous that the number of carbon atoms which constitute the chain connecting two adjacent reactive amino groups in the same molecule is generally not more than 15, preferably not more than 10, and more preferably 2 to 5.

The molecular weight of the polyamino compound is not critical, and may range from a low molecular weight to a high molecular weight. From the standpoint of the characteristics, especially oxidation resistance, of the resulting membrane, suitable polyamino compounds have a molecular weight of generally not more than 1000, preferably 60 to 500, especially preferably 100 to 300.

Polyamino compounds that can be used in this invention can be selected from any known polyamino compounds which have the aforesaid characteristics. Typical examples are given below. We do not intend however to limit the scope of the invention by the following exemplification.

(1) Aliphatic polyamines

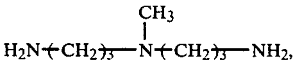

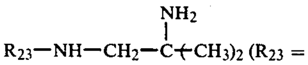 ($R_{23}$ = lower alkyl), $H_2N—CH_2—CH_2—NH_2$, $H_2N(CH_2—CH_2—NH)_{m3}H$ ($m_3$ = 1-20), $H_2N(CH_2)_{m4}NH_2$ ($m_4$ = 1-10),

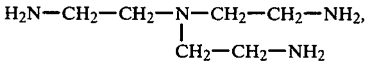

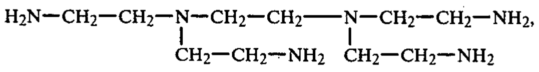

$R_{24}NH(CH_2)_{m4'}NH_2$ ($R_{24}$ = lower alkyl; $m_4'$ = 2-10)

$NC—CH_2—CH_2—NH(CH_2—CH_2—NH)_{m4''}H$, $NC—CH_2—CH_2—NH(CH_2—CH_2—NH)_{m5}CH_2—CH_2—CN$ $H_2N—CH_2—CH_2—O—CH_2—CH_2—NH_2$, $H_2N—CH_2—CH_2—CH_2—O—CH_2—CH_2—CH_2—NH_2$,

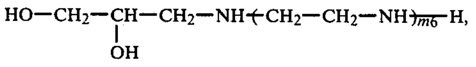

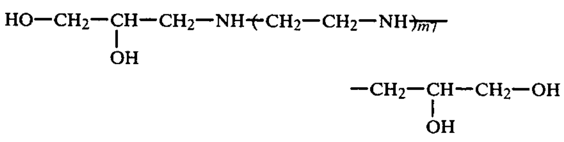

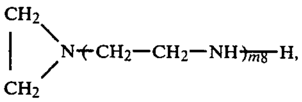

$Cl—CH_2—CH_2—NH(CH_2—CH_2—NH)_{m9}H$,

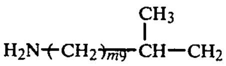 and

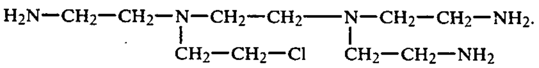

($m_4''$-$m_8$ = an integer of 1-20, $m_9$, $m_9'$ = an integer of 1-10)

(2) Alicyclic polyamines

-continued

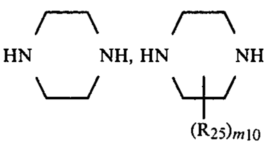 ($R_{25}$ = H or $CH_3$, $C_2H_5$, $m_{10}$ = an integer of 1-8), 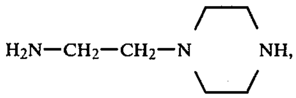

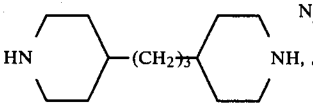 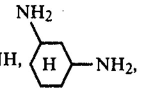

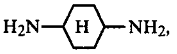

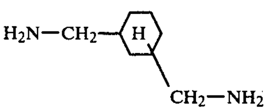 , 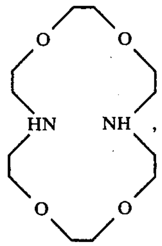 ,

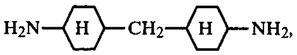

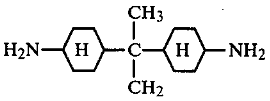

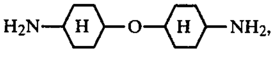 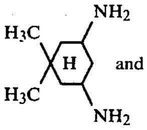 and

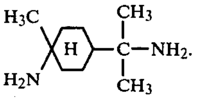

(3) Aromatic polyamines

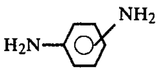 , 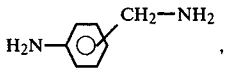 ,

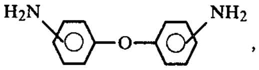 , 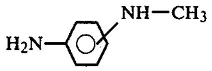 ,

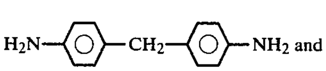 and 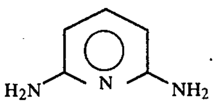 .

These polyamino compounds can be used either alone or as a mixture of two or more.

Polyamino compounds that can be used advantageously in this invention belong to the following group.

(i) Aliphatic polyamino compounds expressed by the following formula (VI), (VII) or (VIII).

$$R_{10}—HN—R_6—NH—R_{11} \quad (VI)$$

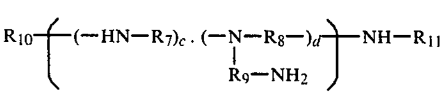 (VII)

-continued $R_{10}—HN—R_{13}—(R_{12}—O)_e—R_{14}—NH—R_{11}$ (VIII)

wherein $R_6$, $R_7$, $R_8$, $R_9$, $R_{12}$, $R_{13}$ and $R_{14}$, independently from each other, represent a lower alkylene group, especially an ethylene group, $R_{10}$ and $R_{11}$, independently from each other, represent a hydrogen atom or a lower alkyl group, especially an ethyl or propyl group optionally containing one substituent selected from cyano, hydroxyl, carboxyl and sulfo, c is an integer of 1 to 20, d is an integer of 0 to 5, and e is an integer of 1 to 3; in formula (VII), c recurring units (—NH—$R_7$—) and d recurring units

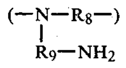

may be arranged in any optional sequence.

(ii) Alicyclic polyamino compounds, having 5 to 15 carbon atoms and 2 to 4 primary amino groups, especially 1,4-diaminocyclohexane.

(iii) Heterocyclic polyamino groups of formula (IX) or (X) below.

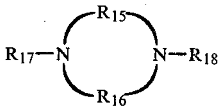
(IX)

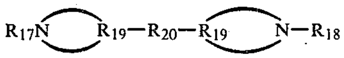
(X)

wherein $R_{15}$ and $R_{16}$, independently from each other, represent an alkylene group containing 4 to 12 carbon atoms optionally having an ether linkage, $R_{17}$ and $R_{18}$, independently from each other, represent a hydrogen atom or the group $R_{10}—NH—R_{13}$—in which $R_{10}$ and $R_{13}$ are as defined, $R_{19}$ represents a trivalent saturated lower aliphatic hydrocarbon group, and $R_{20}$ represents a lower alkylene group.

Of these polyamino compounds, especially preferred are those of the following formula

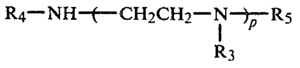
(IV)

wherein $R_3$ represents a hydrogen atom or the group —$CH_2$—$CH_2$—$NH_2$, $R_4$ and $R_5$, independently from each other, represent a hydrogen atom or a lower alkyl group optionally substituted by cyano or hydroxyl, p is a number of 2 to 10; $R_3$ groups may be the same or different; and when $R_5$ is a cyanoethyl group, $R_3$ is a hydrogen atom.

Specific examples of polyamino compounds that can be used especially advantageously in this invention include the following:

$H_2N—(CH_2—CH_2—NH)_{m9''}—H$ ($m_9''$ = 2-10),
$NC—CH_2—CH_2—NH—(CH_2—CH_2—NH)_{m11}—H$,
$NC—CH_2—CH_2—NH—(CH_2—CH_2—NH)_{m12}—CH_2—CH_2—CN$
($m_{11}$, $m_{12}$ = 2-10),

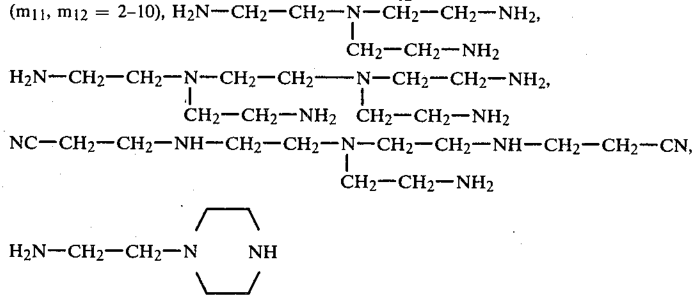

These polyamino groups can be used either alone or as a mixture of two or more.

The polyaddition reaction between the polyepoxy compound and the polyamino compound can be performed in a manner known per se. For example, the polyepoxy compound is reacted with the polyamino compound at a temperature of not more than about 50° C., preferably at a temperature of −30° C. to 30° C., in a suitable inert medium such as water, a lower alcohol (e.g., methanol, ethanol or propanol), or an ether (e.g., diethyl ether, tetrahydrofuran or dioxane).

The amount of the polyamino compound can be varied widely depending upon the epoxy equivalent of the starting epoxy compound and the amino equivalent of the polyamino compound. The amount is advantageously such that the equivalent ratio of the epoxy groups of the polyepoxy compound to the reactive amino groups of the polyamino compound is generally from 1:20 to 2:1, preferably from 1:10 to 1:1, especially from 1:6 to 1:1. The polyaddition reaction proceeds almost quantitatively to afford a polyaddition product of the polyepoxy compound and the polyamino compound in the above equivalent ratio.

The polyaddition product may also be obtained by reacting a halohydrin precursor of the polyepoxy compound with the polyamino compound to form an epoxy ring in situ as schematically shown below.

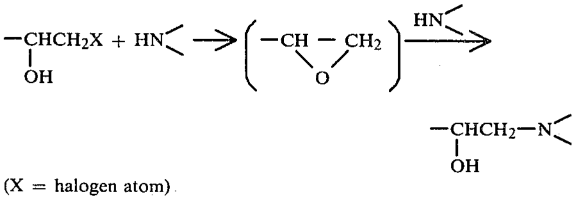

(X = halogen atom)

Hence, the polyaddition product obtained by the reaction of the halohydrin precursor and the polyamino compound is naturally included within the definition of the polyaddition product used in this invention.

The halohydrin precursor used in this reaction can be readily obtained by ring-opening of the epoxy groups of the polyepoxy compounds of this invention with hydrogen halides.

The unreacted epoxy groups should not substantially remain in the resulting polyaddition product, and the starting materials and the polyaddition reaction conditions should be selected so as not to form a high degree of network. The reaction between the polyepoxy compound and the polyamine compound can be performed by adding and mixing the two materials at a time, or by adding one of the starting materials gradually to the other to perform a stepwise synthesis. The resulting polyaddition product has a water solubility at 25° C. of preferably at least 0.5 g per 100 g of water, more preferably at least 1.0 g per 100 g of water, especially 1.5 to 3.0 g per 100 g of water.

The polyaddition product is the product resulting from the addition reaction between the epoxy groups of the polyepoxy compound and the reactive amino groups of the polyamino compounds involving the ring-opening of the epoxy groups as schematically shown below:

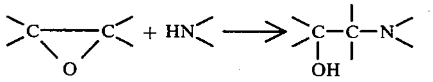

Accordingly, the degree of polyaddition can be known from the equivalents of hydroxyl groups formed as a result of the ring-opening of the epoxy groups. The polyaddition product that can be advantageously used in this invention may contain the hydroxyl groups resulting from the ring-opening of the epoxy groups in a hydroxyl equivalent of at least 0.5 meq per gram of the polyaddition product, preferably 1.0 to 15, especially preferably 1.0 to 10, meq per gram of the polyaddition product.

The term "hydroxyl equivalent", as used in the present specification and the appended claims, is the value calculated in accordance with the following equation (1). In the equation, $E_1$, $E_2$ and $E_3$ are measured by a combination of a known hydroxyl determining method (for example, the acid catalyzed acetylating method or the $BF_3$-Fisher method) with a known epoxy equivalent determining method and amino group determining method.

$$E = E_3 - \frac{E_1W_1 + E_2W_2}{W_1 + W_2} \quad (1)$$

where E = the hydroxyl group equivalents resulting from the ring-opening of the epoxy groups, which are contained per gram of the polyaddition product;

$E_3$ = the total hydroxyl group equivalents contained per gram of the polyaddition product;

$E_1$ = the hydroxyl group equivalents contained per gram of the polyepoxy compound; $E_2$ = the hydroxyl group equivalents contained per gram of the polyamine;

$W_1$ = the amount in grams of the polyepoxy compound charged; and $W_2$ = the amount in grams of the polyamine charged.

The amino groups introduced into the polyaddition product by the above polyaddition reaction afford crosslinking sites for a crosslinking reaction to be described, and play an important role of improving the flux of the final membrane. The amount of the amino groups in the polyaddition product, that is, the amino equivalent, is one of the important factors for determining the characteristics of the final membrane. Suitably, therefore, the polyaddition product in accordance with this invention has an amino equivalent of generally 1.0 to 40, preferably 2.0 to 30, more preferably 3.0 to 20, meq per gram of the polyaddition product.

Especially suitable polyaddition products for use in this invention are those which are derived from the preferred polyepoxy compounds described hereinabove and the preferred polyamino compounds described hereinabove, and therefore, have two or more structural moieties of the following formula

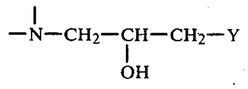

(I)

wherein Y represents —O— or

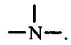

In formula (I), the two vacant bonds of the nitrogen atom at the left end are attached to a residue of the polyamino compound described above, and the vacant bond of the group Y at the right end is attached to a residue of the polyepoxy compound described above.

More preferably, the structural moiety of formula (I) in the polyaddition product has a hydroxyl equivalent of at least 0.5, preferably 1.0 to 15, especially 1.0 to 10, meq per gram of the polyaddition product and an amine equivalent of 1.0 to 40, preferably 2.0 to 30, especially 3.0 to 20, meq per gram of the polyaddition product.

The polyaddition product can be shaped into a thin film before crosslinking. Shaping can be performed in quite the same manner as the conventional method disclosed, for example, in the above-cited U.S. Patents. For example, the thin film can be formed in situ upon a microporous substrate or it can be formed separately, as by a floatation-deposition method.

Substrates that can be used may be any of the types conventionally used in reverse osmosis process. They include porous glass, sintered metals, ceramics, and organic polymeric materials such as cellulose esters, styrene resins, vinyl butyral resins, polysulfone, chlorinated polyvinyl chloride, etc. described in U.S. Pat. No. 3,676,203. Polysulfone film has been found to be a particularly effective support material for the membranes of the invention, and chlorinated polyvinyl chloride is another very effective support material. Preparation of polysulfone microporous substrate is described in Office of Saline Water Research and Development Progress Report No. 359, October 1968.

These substrates preferably have a surface pore size of generally 100 to 1000 Å, but are not limited to these specific sizes. Depending upon the use of the final membrane product, surface pores ranging in size from about 50 Å to about 5000 Å may be acceptable.

The substrate may be of an isotropic structure or an anisotropic structure, desirably of the latter structure. When the membrane constant of the substrate is less than $10^{-4}$ g/cm$^2$·sec·atm, the water permeability of the substrate is too low, and when it is more than 1 g/cm$^2$·sec·atm, the salt rejection tends to be extremely low. Accordingly, preferred membrane constants are 1 to $10^{-4}$ g/cm$^2$·sec·atm, and the best results are obtained with a membrane constant of $10^{-1}$ to $10^{-3}$ g/cm$^2$·sec·atm. The term "membrane constant", as used herein, denotes the amount of pure water which permeates through the membrane under a pressure of 2 kg/cm$^2$, and is expressed in g/cm$^2$·sec·atm.

Preferably, the substrate is used reinforced at its back with a woven or non-woven cloth, etc. Examples of the woven or non-woven cloth are those of polyethylene terephthalate, polystyrene, polypropylene, nylon or vinyl chloride resins.

When it is desired to form a thin film of the polyaddition product in situ on the microporous substrate, the microporous substrate is treated with a solution of the polyaddition product. The treatment can be performed by coating at least one surface of the substrate with a solution of the polyaddition product by a suitable method such as solution casting, brush coating, spraying, wig coating or roll coating; or by immersing the substrate in a solution of the polyaddition product.

For the preparation of the polyaddition product solution in this treatment, water, alcohols such as methanol, ethanol or isopropanol, and ethers such as tetrahydrofuran and dioxane can be used as a solvent. The concentration of the polyaddition product in the solution is not critical, and can be varied widely according, for example, to the type of the polyaddition product or the characteristics required of the final membrane. Advantageously, the concentration of the polyaddition product is generally at least 0.5% by weight, preferably 1.0 to 5.0% by weight, especially 1.5 to 3.0% by weight.

The substrate so treated by coating or immersion is then subjected to a drain treatment. The drain treatment can be carried out generally at room temperature for 1 to 30 minutes, preferably 5 to 20 minutes. As a result, a thin film material of the polyaddition product having a total thickness of about 500 to about 10000 Å, preferably about 1000 to about 4000 Å, is deposited on the surface of the substrate.

The substrate having the thin film deposited on the support is then subjected to a crosslinking treatment by using a polyfunctional compound selected from aromatic, heterocyclic and alicyclic compounds containing at least two functional groups selected from acid halide, sulfonyl halide, isocyanate and acid anhydride groups to crosslink the thin film material of the polyaddition product on the substrate.

The crosslinking reaction is effected usually by an interfacial reaction between the surface of the film material of the polyaddition product and the polyfunctional compound to produce a thin film having permselectivity on the surface of the substrate. Since the main purpose of the polyfunctional compound is to provide an interfacial reaction substantially concentrated on or confined to the surface of the film of the polyaddition product, the polyfunctional compounds should be preferably selected in accordance with the principles of interfacial reaction. For example, when the polyaddition product film is coated from an aqueous solution, the polyfunctional compound or polyfunctional compound solution should be substantially insoluble in water. For this and other reasons, various polyfunctional compounds compatible with non-polar organic solvents such as hydrocarbons but substantially insoluble in water are preferred. Selection of the polyfunctional compounds is also governed by empirical conditions, e.g. the salt rejection and flux properties or resistance to compaction of the ultimately obtained membrane, and the selection can be achieved easily by any one skilled in the art by performing small-scale routine experiments.

The functional groups of the polyfunctional compounds that can be used in this invention are either one of acid halide groups (—COX), sulfonyl halide groups (—$SO_2$X), isocyanate groups (—NCO) and acid anhydride groups

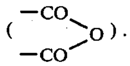.

At least two, preferably 2 or 3, of these functional groups can be contained per molecule. Especially suitable functional groups are acid halide groups and sulfonyl halide groups. Two or more functional groups present in one molecule may be of the same kind or of different types. The polyfunctional compounds generally have a cyclic structure, and may be aromatic, heterocyclic or alicyclic. For the purpose of the present invention, aromatic polyfunctional compounds have been found to be especially effective.

Any mononuclear or polynuclear (especially, binuclear) aromatic polyfunctional compounds having at least two, preferably two or three, functional groups bonded to the aromatic ring and 6 to 20, preferably 6 to 15, carbon atoms can be suitably used in the present invention. Preferably, the aromatic ring or rings should not contain a substituent other than the above functional groups. However, one or two groups which do not substantially affect the crosslinking reaction, such as lower alkyl groups, lower alkoxy groups or halogen atoms, may be present on the aromatic ring.

An especially desirable group of the aromatic polyfunctional compounds includes those of the following formula

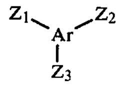
(XI)

wherein Ar represents a benzene ring, a naphthalene ring, or the ring

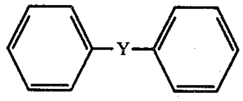

in which Y represents —$CH_2$—,

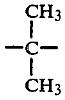,

—O—, —$SO_2$— or —CO—, $Z_1$, $Z_2$ and $Z_3$, independently from each other, represent an acid halide, sulfonyl halide or isocyanate group; or $Z_1$ and $Z_2$ together represent an acid anhydride group; it is especially desirable that $Z_1$, $Z_2$ and $Z_3$ be selected from acid halide and sulfonyl halide groups. Typical examples of the aromatic polyfunctional groups are shown below.

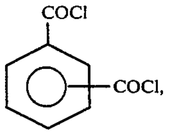 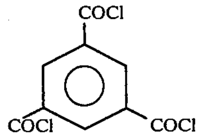,

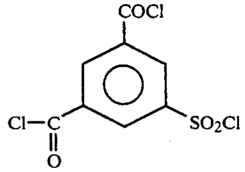, 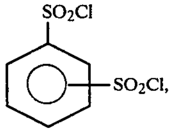

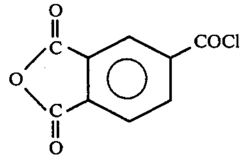,

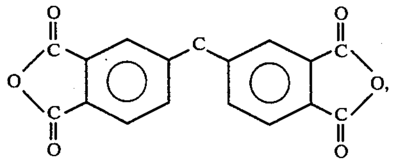

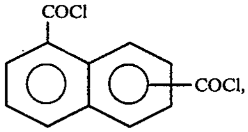 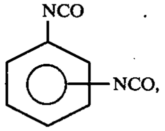

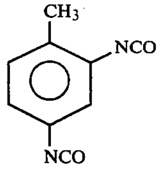,

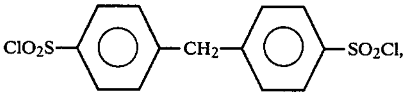

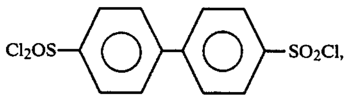

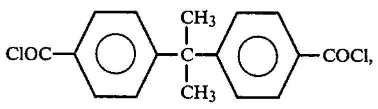

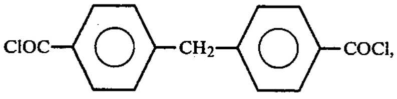

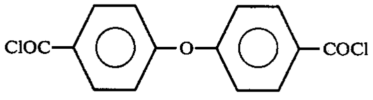 and

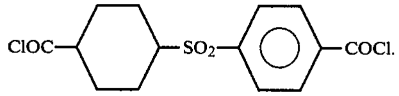

Especially advantageous aromatic polyfunctional compounds are isophthaloyl chloride, terephthaloyl chloride, trimesiloyl chloride and 3-chlorosulfonyl-isophthaloyl chloride.

Preferred heterocyclic polyfunctional compounds that can be used in this invention are 5- or 6-membered heteroaromatic or heteroalicyclic compounds having two or three functional groups bonded to the heterocyclic ring and containing 1 or 2 nitrogen, oxygen or sulfur atoms as hetero atoms. Examples are as follows:

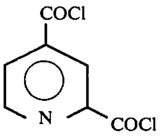, 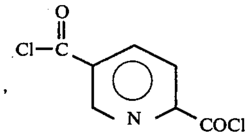,

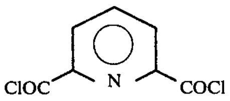, 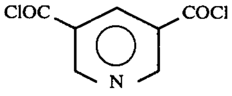,

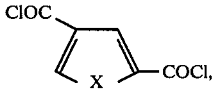 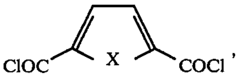

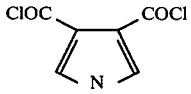, and 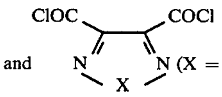 (X = O, S)

Preferred cyclic polyfunctional compounds that can be used are those having 2 or 3 functional groups bonded to the alicyclic ring and containing 5 to 20, preferably 6 to 15, carbon atoms. Examples are as follows:

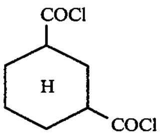, 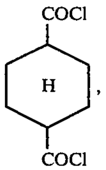

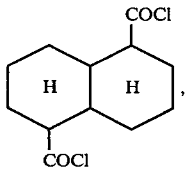 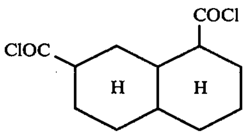

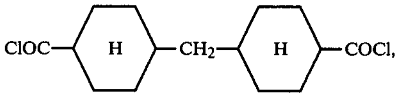

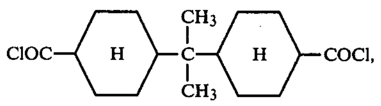

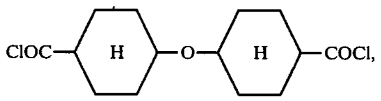

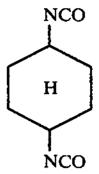 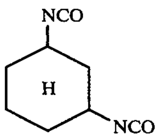,

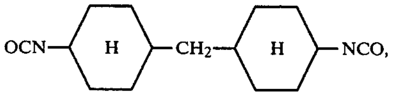

-continued

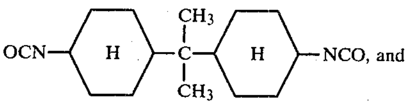

and

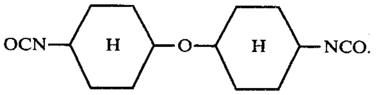

The aromatic heterocyclic or alicyclic polyfunctional compounds can be used either alone or as a mixture of two or more.

It has been found that the salt rejecting and/or flux properties of the finally obtained membrane can be improved by using trifunctional compounds rather than difunctional ones when they are used singly, and by using a combination of a difunctional compound and a trifunctional compound when they are used in combination. Thus, especially preferred polyfunctional compounds to be used in the present invention are trifunctional aromatic compounds, and mixtures of difunctional aromatic compounds and trifunctional aromatic compounds. When a mixture of a difunctional compound and a trifunctional compound is used, the mixing ratio between them is not critical. Generally, the weight ratio of the difunctional compound to the trifunctional compound is from 10:1 to 1:3, preferably from 5:1 to 1:1.

The crosslinking of the film material of the polyaddition product can be performed usually by contacting the film with a solution of the polyfunctional compound. The solvent used to dissolve the polyfunctional compound should not substantially dissolve the polyaddition product and the substrate material, and includes hydrocarbons such as n-hexane, n-heptane, n-octane, cyclohexane, n-nonane and n-decane. The optimal concentration of the polyfunctional compound in the solvent may vary considerably depending upon the specific compound, solvent, substrate, etc., and is best determined experimentally. However, concentrations of about 0.5 to 5.0, preferably about 1.0 to 3.0, % by weight are generally satisfactory.

Conveniently, the crosslinking is accomplished on the interface between the film and the solution by immersing the film in the solution of the polyfunctional compound. In order to promote this crosslinking reaction, it is possible to include a crosslinking accelerator into the film of the polyaddition product or into the solution of the polyfunctional compound. Suitable accelerators are, for example, alkali metal or alkaline earth metal hydroxides, sodium phosphate, pyridine, surface-active agents, and sodium acetate.

The interfacial crosslinking reaction between the surface of the film and the polyfunctional agent can be carried out at room temperature to about 100° C., preferably 20° to 50° C., for a period of 10 seconds to 10 minutes, preferably 30 seconds to 5 minutes. This interfacial reaction can be performed so that it is concentrated largely on the surface of the film, and it is not necessary to reduce the water sensitivity of the internal regions of the film.

Then, the film supported on the substrate is optionally subjected to a drain treatment to drain the excess of the polyfunctional compound solution for 10 seconds to 2 minutes, and then heat-treated at a temperature of 70° to 150° C., preferably 90° to 130° C. This can complete the crosslinking reaction and achieve the insolubilization of the film of the polyaddition product.

Thus, a composite membrane is obtained which has a thin film of the crosslinked polyaddition product having permselectivity on the surface of the microporous substrate.

The resulting membrane can be used directly in applications to be described below. If required, it may be subjected to a post-treatment step to be described.

For example, the membrane can be treated with a solution of a compound containing a metal atom having the ability to form a chelate with a primary amine group, a secondary amino group, a hydroxyl group, a carboxyl group and/or a sulfo group to form a membrane in which such a functional group that may be present in the crosslinked thin film is chelated with the metal atom. This membrane has enhanced flux properties as compared with the untreated membrane. Examples of the metal compound which can be used for this treatment include $BaCl_2$, $MgCl_2$, $HgCl_2$, $CuCl_2$, $CaCl_2$, $FeCl_3$, $AlCl_3$ and $CoCl_3$. Of these, $FeCl_3$, $BaCl_2$, $CaCl_2$ and $MgCl_2$ are preferred.

This treatment can be easily performed by immersing the membrane in an aqueous solution of the metal compound (in a concentration of 1 to 30% by weight) for about 10 to 60 minutes.

The membrane thus obtained can be treated with a liquid polyepoxy compound selected from the polyepoxy compounds of formula (II), acrylonitrile, a lactone such as γ-butyrolactone or β-lactone, or propanesultone to improve its oxidation resistance and salt rejection further. This treatment can be performed by immersing the membrane in a solution (concentration about 0.5 to 3% by weight) of the treating agent at room temperature for 1 to 10 minutes.

Thus, according to this invention, there is provided a composite permselective membrane comprising a microporous substrate and a permselective thin film of the type described hereinabove formed on one surface of the microporous substrate. In the composite membrane, the thickness of the permselective thin film is not strictly set, and it may have a total thickness of at least 100 Å, usually 1000 to 4000 Å.

It is also within the scope of this invention to provide a protective coating on the surface of the composite membrane of the invention. Deposition of the protective coating on the thin film is carried out by coating the barrier film with a water-soluble organic polymer such as polyvinyl alcohol, polyvinyl pyrrolidone, polyacrylamide, polyacrylic acid, polyvinyl methyl ether, and polyvinyl ethyl ether. Polyvinyl alcohol, polyvinyl pyrrolidone and polyvinyl methyl ether are preferred. The polymer is used as a 1–15 wt.%, preferably 3–10 wt.%, aqueous solution. In a specific embodiment, the dried composite semipermeable membrane is passed through a solution of the water-soluble organic polymer or coating the polymer solution on the surface of this barrier film by known means such as dip coating, spraying, or brush coating to coat the film continuously with the solution of the water-soluble organic polymer; then the water is removed; and to form a final product, the coated composite semipermeable membrane is dried at a temperature of about 90° to 100° C. for about 5 to 10 minutes.

The membrane having permselectivity provided by this invention is very suitable as a permselective membrane for the applications to be described because it has superior salt rejection and flux properties, especially flux properties, superior flexibility, high resistance to compaction and high resistance to chemical and biological degradation, especially oxidation resistance and hydrolysis resistance.

The membrane of this invention can be advantageously used as a permselective membrane to separate and remove tiny amounts of contaminated molecules dispersed or dissolved in a liquid or gas, and can find extensive application in, for example, the desalting of sea water and brackish water, and the treatment of industrial effluents containing organic matter, liquors containing a mixture of organic substances, and waste waters from the food industry.

The membrane of this invention can be used especially advantageously as a reverse osmosis membrane in the method for desalination of saline or brackish water by reverse osmosis which comprises contacting the saline or brackish water under pressure with the reverse osmosis membrane. This method is known, and a specific procedure described, for example, in Ind. Eng. Chem. Foundam. 3, 206 (1964) can be used. Thus, the disclosure of this literature reference is incorporated herein by reference.

The following Examples further illustrate the present invention.

PREPARATION OF A FABRIC REINFORCED MICROPOROUS SUBSTRATE

A Dacron non-woven fabric (basis weight 180 g/m$^2$) was fixed on a glass plate. Then, a solution containing 12.5% by weight of polysulfone, 12.5% by weight of methyl Cellosolve and the remainder being dimethyl formamide was cast onto the fabric in a layer having a thickness of about 0.2 micron. Immediately, the polysulfone layer was gelled in a room temperature water bath to form a non-woven fabric-reinforced microporous polysulfone membrane.

The resulting microporous polysulfone layer had a thickness of about 40 to 70 microns and had an anisotropic structure. By observation with an electron micrograph, the surface of the microporous layer was found to contain numerous micropores with a size of 50 to 600 Å.

The resulting microporous substrate had a pure water flux (membrane constant) of about 3.0 to $7.0\times10^{-2}$ g/cm$^2$·sec·atm.

REVERSE OSMOSIS TESTING METHOD

Reverse osmosis was carried out in an ordinary continuous pump-type reverse osmosis device using a 5000 ppm aqueous solution of sodium chloride or a 10,000 ppm aqueous solution of sodium chloride at a pH of 7.0 and a temperature of 25° C. The operating pressure was 42.5 kg/cm$^2$·G or 40 kg/cm$^2$·G.

SALT REJECTION

The salt rejection (%) is a value calculated from the following equation.

$$\text{Salt rejection (\%)} = \left(1 - \frac{\text{NaCl concentration in permeating water}}{\text{NaCl concentration in the test solution}}\right) \times 100$$

METHODS FOR MEASURING THE VARIOUS EQUIVALENTS (1) Epoxy equivalent

Measured by the HCl-dioxane titration method disclosed, for example, in G. A. Stenmark, Anal. Chem., 29, 1867 (1957).

(2) Amine equivalent

The total amine equivalent is measured by the perchloric acid-acetic acid titration method described, for example, in J. B. Conant and N. F. Hall, J. Am. Chem. Soc., 49, 3047 (1927). The determination of the tertiary amine equivalent is made by the "acetylation-perchloric acid method" described, for example, in C. D. Wagner, R. D. Brown and E. D. Peters, J. Am. Chem. Soc., 69, 2609 (1947).

The equivalent weight of (primary amine+secondary amine) is calculated by subtracting the tertiary amine equivalent from the total amine equivalent.

(3) Hydroxyl equivalent

Measured by the $BF_3$-Fisher method described in J. Am. Chem. Soc., 62, 1 (1940).

The amine equivalents and hydroxyl equivalents of the polyaddition products obtained in the following Examples are shown below.

| Example | Amine equivalent (meq/g) | Hydroxyl equivalent (meq/g) |
|---|---|---|
| 2 | 17.8 | 1.6 |
| 4 | 16.1 | 4.0 |
| 6 | 17.7 | 3.2 |
| 8 | 17.0 | 3.6 |
| 10 | 17.8 | 3.3 |
| 12 | 18.6 | 2.9 |
| 14 | 17.0 | 3.7 |
| 16 | 17.8 | 3.3 |
| 18 | 19.2 | 2.7 |
| 20 | 17.7 | 3.2 |
| 22 | 17.0 | 3.2 |
| 24 | 17.8 | 3.3 |
| 26 | 17.0 | 3.5 |
| 38 | 17.7 | 3.1 |
| 39 | 18.2 | 2.8 |
| 42 | 16.7 | 3.8 |
| 43 | 17.6 | 3.3 |

EXAMPLE 1

A three-necked flask equipped with a stirrer, a thermometer and a dropping funnel was charged with 80 g of distilled water and 21.9 g of triethylene tetramine (a product of Tokyo Kasei Kogyo Kabushiki Kaisha; with an amino equivalent of 27.2 meq/g), and they were mixed to form a solution. To the solution was added 7.4 g (0.025 mole) of triglycidyl isocyanurate ("ARALDITE" TGIC, a product of Nagase Sangyo Kabushiki Kaisha; with an epoxy equivalent of 105 g/eq.), and the mixture was stirred. The mixture was then heated to 50° C., and stirred for about 3 hours until it became a uniform solution. With stirring at the same temperature, 3.6 g (0.025 mole) of sorbitol polyglycidyl ether ("DENACOL" EX-611, a product of Nagase Sangyo Kabushiki Kaisha; with an epoxy equivalent of 170 and a Cl content of 14.0% by weight) was added through the dropping funnel over the course of 30 minutes. The mixture was further stirred for 3 hours at the same temperature, and allowed to cool to room temperature, followed by standing for about 20 hours.

The resulting reaction mixture was filtered through a microfilter, and the filtrate was diluted with distilled water until the concentration of the polyaddition product became 2.5% became 2.5% by weight. The resulting polyaddition product had a hydroxyl equivalent of 2.8 meq/g and an amino equivalent of 18.6 meq/g.

A non-woven fabric-reinforced polysulfone porous membrane (with a polysulfone membrane thickness of about 60 microns and a membrane constant of $5.2\times10^{-2}$ g/cm$^2$·sec·atm) obtained by the method described hereinabove was immersed in the diluted solution at room temperature for 2 minutes. The membrane was withdrawn and caused to stand vertical to allow the solution to drain for 10 minutes. The treated membrane was immersed in a 1.5% n-hexane solution of isophthaloyl chloride and trimesoyl chloride as a cross-linking agent (with the isophthaloyl chloride/trimesoyl chloride weight ratio being 5/1). The membrane was taken out, and allowed to stand for 1 minute in the air to volatilize the n-hexane adhering to the membrane surface.

The dried membrane was heat-treated in a hot air dryer at 115° to 120° C. for 10 minutes.

The composite membrane obtained was subjected to the reverse osmosis test (0.5% aqueous solution of sodium chloride, at an operating pressure of 42.5 kg/cm$^2$·G) by the method described hereinabove. The water flux was 151.9 liters/m$^2$·hr (91.1 G.F.D.) and the salt rejection was 98.2%.

When the operation was performed continuously for 100 hours, the water flux was 142 liters/m$^2$·hr (85.2 G.F.D.) and the salt rejection was 98.5%. The composite membrane obtained thus had very good resistance to compaction.

EXAMPLES 2 AND 3

The procedure of Example 1 was repeated except that the amounts of triethylene tetramine, triglycidyl isocyanutate and sorbitol polyglycidyl ether were changed as shown in Table 1. Composite membranes having the initial properties shown in Table 1 were obtained.

TABLE 1

| Example | Amounts (grams) Triethylene tetramine | Triglycidyl isocyanurate | Glycerol polyglycidyl ether* | Initial properties Water flux (l/m$^2$ · hr) | Salt rejection (%) |
|---|---|---|---|---|---|
| 2 | 21.9 | 9.9 | 2.6 | 84.7 | 97.2 |

TABLE 1-continued

| Example | Amounts (grams) Triethylene tetramine | Triglycidyl isocyanurate | Glycerol polyglycidyl ether* | Initial properties Water flux (l/m$^2$ · hr) | Salt rejection (%) |
|---|---|---|---|---|---|
| 3 | 21.9 | 5.0 | 5.0 | 156.8 | 96.8 |

EXAMPLES 4 TO 6

The procedure of Example 1 was repeated except that diethylene triamine (a product of Tokyo Kasei Kogyo Kabushiki Kaisha; with an amino equivalent of 29.1 meq/g) was used instead of triethylene tetramine, and the amounts of this and other materials used were set as shown in Table 2. The initial properties of the composite membranes obtained are shown in Table 2.

TABLE 2

| Example | Amounts (grams) Diethylene triamine | Triglycidyl isocyanurate | Glycerol polyglycidyl ether | Initial properties Water flux (l/m$^2$ · hr) | Salt rejection (%) |
|---|---|---|---|---|---|
| 4 | 15.5 | 9.9 | 2.6 | 113.4 | 97.7 |
| 5 | 15.5 | 7.4 | 3.6 | 120.3 | 98.1 |
| 6 | 15.5 | 5.0 | 5.0 | 111.5 | 98.4 |

EXAMPLES 7 TO 18

The procedure of Example 1 was repeated except that 1,1,1-trimethylolpropane polyglycidyl ether ("DENACOL" EX 321, a product of Nagase Sangyo Kabushiki Kaisha; with an epoxy equivalent of 130 and a Cl content of 1.0% by weight) or glycerol polyglycidyl ether ("DENACOL" EX 314, a product of Nagase Sangyo Kabushiki Kaisha; with an epoxy equivalent of 145 and a Cl content of 12.5 by weight) was used instead of the sorbitol polyglycidyl ether, and the amounts of this compound and triglycidyl isocyanurate (TGIC for short) and diethylene triamine (DETA for short) or triethylene tetramine (TETA for short) were set as shown in Table 3. The resulting composite membranes were subjected to the same reverse osmosis test, and were found to have the initial properties shown in Table 3.

TABLE 3

| Example | Amounts (grams) Amine DETA | TETA | TGIC | Epoxy 1,1,1-trimethylol propane polyglycidyl ether | Glycerol polyglycidyl ether | Initial properties Water flux (l/m$^2$ · hr) | Salt rejection (%) |
|---|---|---|---|---|---|---|---|
| 7 | 15.5 | — | 9.9 | — | 2.6 | 143.4 | 98.3 |
| 8 | 15.5 | — | 7.4 | — | 3.6 | 69.8 | 98.7 |
| 9 | 15.5 | — | 5.0 | — | 5.0 | 112.0 | 98.4 |
| 10* | — | 21.9 | 9.9 | — | 2.6 | 172.5 | 97.7 |
| 11 | — | 21.9 | 7.4 | — | 3.6 | 143.8 | 97.9 |
| 12* | — | 21.9 | 5.0 | — | 5.0 | 138.6 | 97.0 |
| 13 | 15.5 | — | 9.9 | 2.6 | — | 56.6 | 98.2 |
| 14 | 15.5 | — | 7.4 | 3.6 | — | 78.1 | 98.3 |
| 15 | 15.5. | — | 5.0 | 5.0 | — | 96.7 | 96.4 |
| 16 | — | 21.9 | 9.9 | 2.6 | — | 132.4 | 97.9 |
| 17* | — | 21.9 | 7.4 | 3.6 | — | 107.9 | 98.2 |
| 18* | — | 21.9 | 5.0 | 5.0 | — | 188.8 | 95.4 |

*The polyaddition product was coated on one surface of the polysulfone substrate. In the other Examples, the polyaddition product was dipcoated on both surfaces of the substrate.

EXAMPLES 19 TO 37

The procedure of Example 1 was repeated except that isophthaloyl chloride (IPC for short) or trimesoyl chloride (TMC for short) was used as a crosslinking agent, and the amounts of the crosslinking agent and other compounds were set as shown in Table 4. The resulting composite membranes were subjected to the same reverse osmosis test as in Example 1, and were found to have the initial properties shown in Table 4.

TABLE 4

| | Amount (grams) | | | | | | Crosslinking agent | | Initial properties | |
|---|---|---|---|---|---|---|---|---|---|---|
| | Amine | | | Epoxy | | | | | | |
| Example | DETA | TETA | TGIC | Glycerol polyglycidyl ether | 1,1,1-trimethylol propane polyglycidyl ether | Sorbital polyglycidyl ether | IPC (wt.%) | TMC (wt.%) | Water flux ($l/m^2 \cdot hr$) | Salt rejection (%) |
| 19 | 15.5 | — | 7.4 | 3.6 | — | — | 1.5 | — | 42.6 | 99.0 |
| 20 | 15.5 | — | 5.0 | 5.0 | — | — | 1.5 | — | 79.1 | 98.2 |
| 21 | — | 21.9 | 9.9 | 2.6 | — | — | 1.5 | — | 121.8 | 97.9 |
| 22 | 15.5 | — | 7.4 | — | 3.6 | — | 1.5 | — | 41.1 | 99.2 |
| 23 | 15.5 | — | 5.0 | — | 5.0 | — | 1.5 | — | 41.7 | 99.1 |
| 24 | — | 21.9 | 9.9 | — | 2.6 | — | 1.5 | — | 55.6 | 98.2 |
| 25 | 15.5 | — | 9.9 | — | — | 2.6 | 1.5 | — | 61.1 | 99.2 |
| 26 | 15.5 | — | 7.4 | — | — | 3.6 | 1.5 | — | 104.5 | 98.5 |
| 27 | 15.5 | — | 5.0 | — | — | 5.0 | 1.5 | — | 61.7 | 98.3 |
| 28 | — | 21.9 | 7.4 | — | — | 3.6 | 1.5 | — | 74.5 | 99.2 |
| 29 | 15.5 | — | 9.9 | 2.6 | — | — | — | 1.5 | 129.5 | 97.8 |
| 30 | 15.5 | — | 5.0 | 5.0 | — | — | — | 1.5 | 118.0 | 98.0 |
| 31 | — | 21.9 | 7.4 | 3.6 | — | — | — | 1.5 | 164.9 | 97.2 |
| 32 | 15.5 | — | 9.9 | — | 2.6 | — | — | 1.5 | 109.8 | 97.8 |
| 33 | 15.5 | — | 7.4 | — | 3.6 | — | — | 1.5 | 133.7 | 97.5 |
| 34 | 15.5 | — | 5.0 | — | 5.0 | — | — | 1.5 | 153.7 | 97.8 |
| 35 | — | 21.9 | 5.0 | — | 5.0 | — | — | 1.5 | 140.8 | 96.1 |
| 36 | 15.5 | — | 9.9 | — | — | 2.6 | — | 1.5 | 112.9 | 97.9 |
| 37 | — | 21.9 | 7.4 | — | — | 3.6 | — | 1.5 | 168.9 | 96.4 |

EXAMPLES 38 AND 39

The procedure of Example 1 was repeated except that bisphenol A diglycidyl ether ("EPIKOTE" 828, a product of Shell Chemical Co.; with an epoxy equivalent of 184 to 194) was used instead of the sorbitol polyglycidyl ether, and IPC, TMC or a mixture of these (IPC/TMC=5/1 by weight) was used as a crosslinking agent in the amounts shown in Table 5. The resulting composite membranes were subjected to the reverse osmosis test (using 0.5% sodium chloride solution under an operating pressure of 42.5 $kg/cm^2 \cdot G$), and were found to have the initial properties shown in Table 5.

TABLE 5

| | Amount (grams) | | | Crosslinking agent | | | Initial properties | |
|---|---|---|---|---|---|---|---|---|
| | | | Epoxy | | | | | |
| Example | Amine TETA | TGIC | bisphenol A diglycidyl ether | IPC (wt.%) | TMC (wt.%) | IPC/TMC (wt.%) | Water flux ($l/m^2 \cdot hr$) | Salt rejection (%) |
| | | | | 1.5 | — | — | 32.6 | 97.4 |
| 38 | 21.9 | 9.9 | 2.8 | — | 1.5 | — | 111.7 | 98.1 |
| | | | | — | — | 1.5 | 45.5 | 99.1 |
| | | | | 1.5 | — | — | 30.1 | 99.0 |
| 39 | 21.9 | 7.4 | 4.3 | — | 1.5 | — | 87.0 | 98.4 |
| | | | | — | — | 1.5 | 70.1 | 99.4 |

EXAMPLES 40 AND 41

The procedure of Example 1 was repeated except that bisphenol A diglycidyl ether was used instead of the triglycidyl isocyanurate and glycerol polyglycidyl ether ("DENACOL" 314, a product of Nagase Sangyo Kabushiki Kaisha), instead of the sorbitol polyglycidyl ether, and IPC, TMC or a mixture of these (IPC/TMC=5/1 by weight) was used as a crosslinking agent, in the amounts shown in Table 6. The resulting composite membranes were subjected to the reverse osmosis test in the same way as in Example 1, and the results are shown in Table 6.

TABLE 6

| | Amount (grams) | | | Crosslinking agent | | | Initial properties | |
|---|---|---|---|---|---|---|---|---|
| | | Epoxy | | | | | | |
| Example | Amine TETA | Bisphenol A diglycidyl ether | Glycerol polyglycidyl ether | IPC (wt.%) | TMC (wt.%) | IPC/TMC (wt.%) | Water flux ($l/m^2 \cdot hr$) | Salt rejection (%) |
| | | | | 1.5 | — | — | 32.4 | 99.5 |
| 40 | 21.9 | 6.4 | 5.8 | — | 1.5 | — | 94.7 | 98.4 |
| | | | | — | — | 1.5 | 46.8 | 99.3 |
| | | | | 1.5 | — | — | 14.5 | 99.0 |

TABLE 6-continued

| | Amount (grams) | | | Crosslinking agent | | | Initial properties | |
|---|---|---|---|---|---|---|---|---|
| | | Epoxy | | | | | | |
| Example | Amine TETA | Bisphenol A diglycidyl ether | Glycerol polyglycidyl ether | IPC (wt.%) | TMC (wt.%) | IPC/TMC (wt.%) | Water flux ($l/m^2 \cdot hr$) | Salt rejection (%) |
| 41 | 21.9 | 12.8 | — | — | 1.5 | — | 51.1 | 97.5 |
| | | | | — | — | 1.5 | 27.4 | 99.3 |

EXAMPLES 42 AND 43

The procedure of Example 1 was repeated except that phloroglucinol triglycidyl ether (with an epoxy equivalent of 107 of the following formula

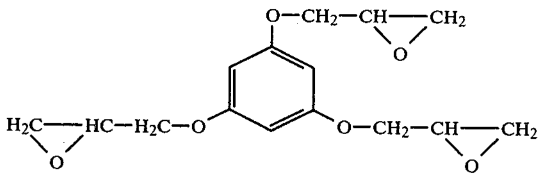

or hydroquinone diglycidyl ether (with an epoxy equivalent of 121) of the following formula

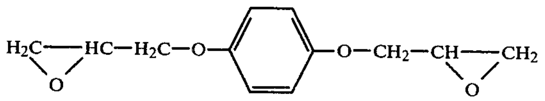

was used instead of the sorbitol polyglycidyl ether, and IPC or an IPC/TMC mixture (IPC/TMC=5/1 by weight) was used as a crosslinking agent, in the amounts shown in Table 7. The resulting composite membranes were subjected to the reverse osmosis test, and were found to have the initial properties shown in Table 7.

TABLE 7

| | Amount (grams) | | | | Crosslinking agent | | Initial properties | |
|---|---|---|---|---|---|---|---|---|
| | | | Epoxy | | | | | |
| Example | Amine TETA | TGIC | Phloroglucinol triglycidyl ether | Hydroquinone diglycidyl ether | IPC (wt.%) | IPC/TMC (wt.%) | Water flux ($l/m^2 \cdot hr$) | Salt rejection (%) |
| 42 | 21.9 | 7.4 | 7.3 | — | 1.5 | — | 59.8 | 99.3 |
| | | | | | — | 1.5 | 121.3 | 97.3 |
| | | | | | 1.5 | — | 47.3 | 99.0 |
| 43 | 21.9 | 7.4 | — | 5.5 | — | 1.5 | 105.4 | 98.3 |

EXAMPLES 44 AND 45

The procedure of Example 1 was repeated except that phloroglucinol triglycidyl ether or hydroquinone diglycidyl ether was used instead of the triglycidyl isocyanurate, and trimethylolpropane polyglycidyl ether ("DENACOL" 321), instead of the sorbitol polyglycidyl ether, and IPC and an IPC/TMC mixture (IPC/TMC=5/1 by weight) was used as a crosslinking agents, in the amounts shown in Table 8. The resulting composite membranes were subjected to the reverse osmosis test, and were found to have the initial properties shown in Table 8.

TABLE 8

| | Amount (grams) | | | | Crosslinking agent | | Initial properties | |
|---|---|---|---|---|---|---|---|---|
| | | Epoxy | | | | | | |
| Example | Amine TETA | Phloroglucinol triglycidyl ether | Hydroquinone digylcidyl ether | Trimethylolpropane polyglycidyl ether | IPC (wt.%) | IPC/TMC (wt.%) | Water flux ($l/m^2 \cdot hr$) | Salt rejection (%) |
| 44 | 21.9 | 14.7 | — | — | 1.5 | — | 17.4 | 99.5 |
| | | | | | — | 1.5 | 37.5 | 98.9 |
| | | 7.4 | — | 3.9 | 1.5 | — | 35.4 | 98.5 |
| | | | | | — | 1.5 | 97.8 | 97.2 |
| 45 | 21.9 | — | 11.1 | — | 1.5 | — | 21.5 | 99.1 |
| | | | | | — | 1.5 | 41.3 | 98.7 |
| | | — | 5.6 | 3.9 | 1.5 | — | 35.9 | 98.0 |
| | | | | | — | 1.5 | 87.9 | 97.8 |

EXAMPLES 46 TO 52

Triethylene tetramine (TETA), pentaethylene hexamine (PEHA), triglycidyl isocyanurate (TGIC), glycerol polyglycidyl ether ("DENACOL" 314) and 1,1,1-trimethylolpropane polyglycidyl ether ("DENACOL" 321) were used in the combinations shown in Table 9, and reacted under the same conditions as in Example 1. The reaction mixture was treated in the same way as in Example 1, and the resulting filtrate was diluted with distilled water to the concentrations shown in Table 9. (the column under Concentration A).

The diluted solution was applied to a polysulfone porous membrane having a thickness of about 60 microns and each of the membrane constants shown in Table 9 by the immersion method or the one surface coating method described below.

TABLE 9

| Example | Amine Type | Amine Amount (g) | Epoxy Type | Epoxy Amoung (g) | Concentration A (wt.%) | Immersion B (min.) | Crosslinking agent Type | Crosslinking agent Mixing ratio | Crosslinking agent Concentration (wt.%) | Immersion C (min.) | Membrane constant (g/cm$^2$ · sec · atm) | Initial properties Water flux (l/m$^2$ · hr) | Initial properties Salt rejection (%) |
|---|---|---|---|---|---|---|---|---|---|---|---|---|---|
| 46 | TETA | 14.6 | Glycerol polyglycidyl ether | 15.4 | 2 | 5 | IPC/ TMC | 3/1 | 1.5 | 5 | 3.96 × $10^{-2}$ | 73.9 | 95.9 |
| 47 | " | " | 1,1,1-trimethylolpropane polyglycidyl ether | 15.4 | 1 | 1 | IPC/ IMC | 5/1 | 0.5 | 1 | 4.30 × $10^{-2}$ | 95.6 | 95.3 |
| 48 | " | " | 1,1,1-trimethylolpropane polyglycidyl | " | 2 | 1 | IPC/ IMC | " | 1.0 | 1 | 6.28 $10^{-2}$ | 94.4 | 95.4 |
| 49 | PEHA | 23.2 | 1,1,1-trimethylolpropane polyglycidyl ether | " | 1 | 2 | IPCl | " | 0.5 | 2 | 4.06 × $10^{-2}$ | 66.4 | 96.0 |
| 50 | TETA | 21.9 | TGIC & glycerol polyglycidyl ether | 7.4 3.9 | 2 | One surface coated | IPCl TMC | 3/1 | 1 | 0.5 | 6.55 × $10^{-2}$ | 70.5 | 97.0 |
| 51 | " | " | IGIC & glycerol polyglycidyl ether | 7.4 3.9 | 3 | One surface coated | IPCl TMC | " | " | 1 | 6.05 × $10^{-2}$ | 84.6 | 95.2 |
| 52 | " | " | TGIC & 1,1,1-trimethylolpropane polyglycidyl ether | 7.4 3.9 | 2 | 5 | IPCl | 5/1 | 1.5 | 5 | 3.88 × $10^{-2}$ | 64.9 | 98.2 |

(i) Immersion method

The polysulfone porous membrane was immersed in the diluted solution at room temperature for a predetermined period of time (given in the column under "Immersion B"), and subjected to a drain treatment in the same way as in Example 1.

(ii) One surface coating method

The diluted solution was coated on the surface of the polysulfone porous membrane, and scraped off by a glass rod, followed by draining for about 1 minute.

The membrane was then immersed at room temperature for a period of time described in the column "Immersion C" in Table 9 in a solution of a crosslinking agent described in the column "Crosslinking agent" in Table 9. The membrane was then treated in the same way as in Example 1 to form a composite membrane.

The composite membranes were subjected to the reverse osmosis test (using a 1% aqueous solution of sodium chloride under an operating pressure of 40 kg/cm$^2$·G). The initial properties of the membranes are shown in Table 9.

EXAMPLES 53 TO 55

A three-necked flask equipped with a stirrer, a thermometer and a dropping funnel was charged with 130 g of distilled water and each of the polyamines shown in Table 10 in the amounts indicated. They were mixed at room temperature. The inside of the flask was purged with nitrogen, and each of the polyepoxy compounds shown in Table 10 in the amounts indicated was added over the course of 30 minutes through the dropping funnel. The mixture was stirred further for 3 hours at the same temperature, and allowed to stand for about 20 hours.

Using the resulting reaction solution, a membrane was produced in the same way as in Example 1 except that each of the crosslinking agents shown in Table 10 was used. The resulting composite membrane was subjected to the reverse osmosis test (using a 1% aqueous solution of sodium chloride under an operating pressure of 40 kg/cm$^2$·G). The initial properties of the resulting composite membranes are shown in Table 10.

TABLE 10

| Example | Amine Type | Amine Amount (g) | Epoxy Type | Epoxy Amount (g) | Crosslinking agent (wt.%) | Initial properties Water flux (l/m$^2$ · hr) | Initial properties Salt rejection (%) |
|---|---|---|---|---|---|---|---|
| 53 | TETA | 14.6 | EPIOL E 100 (*1) | 8.8 | TMC (1.5) | 53.7 | 96.3 |
| 54 | " | " | EPIOL E 100 (*1) | " | IPC (1.5) | 13.1 | 99.1 |
| | | | EPIOL G | | TMC | | |

TABLE 10-continued

| Example | Amine Type | Amine Amount (g) | Epoxy Type | Epoxy Amount (g) | Crosslinking agent (wt.%) | Initial properties: Water flux (l/m$^2$ · hr) | Initial properties: Salt rejection (%) |
|---|---|---|---|---|---|---|---|
| 55 | PEHA | 23.2 | 100 (*2) | 10.2 | (1.5) | 57.1 | 98.5 |

(*1): a tradename for ethylene glycol diglycidyl ether having an epoxy equivalent of 115 and a Cl content of 1% by weight (a product of Nihon Yushi Co., Ltd.).
(*2): a tradename for glycerol diglycidyl ether having an epoxy equivalent of 135 and a Cl content of 10% by weight (a product of Nihon Yushi Co., Ltd.).

EXAMPLES 56 TO 65

The procedure of Example 1 was repeated using the compounds shown in Table 11. When triglycidyl isocyanurate was not used as the polyepoxy compound, the procedure of Example 53 was followed. The results are shown in Table 11.

TABLE 11

| Example | Amine Type | Amine Amount (g) | Epoxy Type | Epoxy Amount (g) | Crosslinking agent | Initial properties: Water flux (l/m$^2$ · hr) | Initial properties: Salt rejection (%) |
|---|---|---|---|---|---|---|---|
| 56 | TETA | 14.6 | EPIOL G 100 | 10.2 | 3-Chlorosulfonyl-isophthaloyl chloride | 41.1 | 94.3 |
| 57 | TETA | 14.6 | EPIOL E 100 | 8.8 | Trimellitoyl chloride | 57.2 | 95.2 |
| 58 | TETA | 14.6 | EPIOL G 100 | 10.2 | Isocinchomeroyl chloride | 53.5 | 90.0 |
| 59 | TETA | 14.6 | EPIOL E 100 | 8.8 | Tolylene diisocyanate and 3-chlorosulfonyl-isophthaloyl chloride (1:1 by weight) | 35.7 | 97.3 |
| 60 | TETA | 14.6 | EPIOL E 100 | 8.8 | Trimellitoyl chloride and TMC (1:5 by weight) | 57.2 | 95.2 |
| 61 | TETA | 14.6 | TGIC | 9.9 | TMC and tolylene diisocyanate (1:1 by weight) | 106 | 95.9 |
| 62 | TETA | 21.9 | TGIC<br>DENACOL EX611 | 7.4<br>3.6 | Cyclohexane-1,4-di-carboxylic chloride | 80.3 | 90.9 |
| 63 | TETA | 21.9 | EPIKOTE 828<br>DENACOL EX321 | 4.3<br>3.6 | Cyclohexane-1,4-di-carboxylic chloride | 45.0 | 93.6 |
| 64 | TETA | 21.9 | TGIC<br>DENACOL EX611 | 7.4<br>3.6 | Tolylene diisocyanate | 33.6 | 98.9 |
| 65 | TETA | 21.9 | EPIKOTE 828<br>DENACOL EX321 | 4.3<br>3.6 | Tolylene | 15.7 | 97.3 |

Note 1: Structures of the crosslinking agents used 3-Chlorosulfonylisophthaloyl chloride

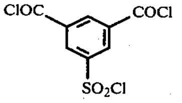

Trimellitoyl chloride

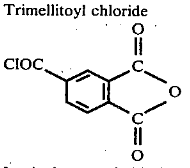

Isocinchomeroyl chloride

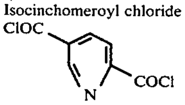

Tolylene diisocyanate

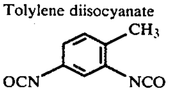

Note 2: In Examples 62 to 65, the reverse osmosis test was performed using a 1% aqueous solution of sodium chloride under an operating pressure of 40 kg/cm$^2$ · G.

EXAMPLES 66 TO 74

The procedure of Example 1 was repeated using the compounds shown in Table 12. The resulting composite membranes were subjected to the reverse osmosis test. The results are shown in Table 12.

TABLE 12

| Ex-ample | Amine Type | Amine Amount (g) | Epoxy Type | Epoxy Amount (g) | Crosslinking agent (1.5% by weight) | Initial properties Water flux ($l/m^2 \cdot hr$) | Initial properties Salt rejection (%) |
|---|---|---|---|---|---|---|---|
| 66 | Aminoethyl piperazine | 12.9 | EPIKOTE 828 | 17.0 | IPC/TMC (5/1) | 21.3 | 96.8 |
| 67 | Aminoethyl piperazine | 3.9 | TGIC | 8.9 | IPC/TMC (5/1) | 17.7 | 96.8 |
| 68 | Hexamethylene diamine | 11.6 | DENACOL EX-321 | 15.4 | IPC/TMC (5/1) | 15.4 | 93.5 |
| 69 | Hexamethylene diamine | 11.6 | TGIC | 9.9 | IPC/TMC (5/1) | 21.3 | 90.3 |
| 70 | 1,4-Diamino-cyclohexane | 12.0 | TGIC | 9.9 | IPC/TMC (5/1) | 27.5 | 94.1 |
| 71 | 1,4-Diamino-cyclohexane | 12.0 | DENACOL EX-314 | 14.6 | IPC/TMC (5/1) | 11.3 | 91.3 |
| 72 | ω, ω'-dicyanoethyl triethylene tetramine | 22.6 | TGIC | 9.9 | IPC/TMC (5/1) | 72.3 | 96.7 |
| 73 | ω, ω'-dicyanoethyl triethylene tetramine | 22.6 | DENACOL EX-321 | 15.4 | IPC/TMC (5/1) | 20.1 | 99.0 |
| 74 | ω, ω'-dicyanoethyl triethylene tetramine | 22.6 | TGIC<br>DENACOL EX-611 | 5.0<br>5.0 | TMC | 63.1 | 94.2 |

Note:
Aminoethyl piperazine

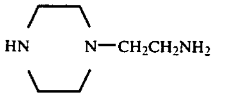

ω, ω'-dicyanoethyl triethylene tetramine
$NC . CH_2CH_2 . NH{-}\!\!(-CH_2CH_2NH-)_3\!\!-CH_2CH_2CN$ .

EXAMPLES 75 AND COMPARATIVE EXAMPLES 1 AND 2

The chlorine resistance of a composite membrane prepared in the same way as in Example 1 was examined.

The chlorine resistance test was performed by using a 3.5% NaCl aqueous solution having a pH of 5.0 to 6.0 and a chlorine concentration of 3 ppm as a test solution and performing a continuous reverse osmosis test at 70 $kg/cm^2 \cdot G$. The tested membrane was evaluated for a deterioration in membrane performance. The results are shown in Table 13 together with the results obtained with other membranes.

TABLE 13

| Run | Membrane | Initial values Water flux ($l/m^2 \cdot hr$) | Initial values Salt rejection (%) | 8 hours later Water flux ($l/m^2 \cdot hr$) | 8 hours later Salt rejection (%) |
|---|---|---|---|---|---|
| Example 75 | PEPA-1*1 | 90.1 | 94.6 | 81.8 | 24.4 |
| Comparative Example 1 | PA-100*2 | 54.4 | 98.3 | 49.9 | 51.7 |
| Comparative Example 2 | NS-100*3 | 31.4 | 98.0 | 137.9 | 35.7 |

*1 Composite membrane obtained in Example 1
*2 Composite membrane comprising a microporous polysulfone support and polyethyleneimine crosslinked with IPC
*3 Composite membrane comprising a microporous polysulfone support and polyethyleneimine crosslinked with TDI

EXAMPLE 76

The composite membrane obtained in Example 74 was tested for chlorine resistance in the same way as in Example 75. The reverse osmosis test was performed at 42.5 $kg/cm^2 \cdot G$ using a 0.5% aqueous solution of sodium chloride having a pH of 5 and a chlorine concentration of 4 ppm. The results are shown in Table 14.

TABLE 14

| | Water flux ($l/m^2 \cdot hr$) | Salt rejection (%) |
|---|---|---|
| Initial values | 63.1 | 94.2 |
| 1 hour later | 71.5 | 97.7 |
| 16 hours later | 140.6 | 96.2 |

EXAMPLE 77

A composite membrane obtained in the same way as in Example 1 was immersed for 10 minutes in a 1 wt.% ethanol solution of sorbitol polyglycidyl ether ("DENACOL" EX-611) as used in Example 1, and then subjected to the same reverse osmosis test as used in Example 1. The membrane had a water flux of 74.5 $l/m^2 \cdot hr$ and a salt rejection of 99.5%.

EXAMPLES 78 TO 81

A composite membrane obtained in the same way as in Example 1 was subjected to a chelation treatment with each aqueous solutions of metal salts shown in Table 15. The results are shown in Table 15.

TABLE 15

| Example | Chelation reagent | Concentration (wt.%) | Immersion time (minutes) | Reverse osmosis properties: Water flux ($l/m^2 \cdot hr$) | Reverse osmosis properties: Salt rejection (%) |
|---|---|---|---|---|---|
| 78 | $CaCl_2$ | 20 | 30 | 173.2 | 95.5 |
| 79 | $MgCl_2$ | 20 | 30 | 193.3 | 93.4 |
| 80 | $BaCl_2$ | 20 | 30 | 182.7 | 92.5 |
| 81 | $FeCH_3$ | 20 | 30 | 198.5 | 91.7 |

The reverse osmosis test was performed at 42.5 $kg/cm^2 \cdot G$ and 25° C. using a 5000 ppm aqueous solution of sodium chloride.

EXAMPLE 82

A polyaddition product was prepared in the same way as in Example 1 except that 10.2 g of N,N,N-tri(2-hydroxy-3-chloro)propyl isocyanurate of the formula

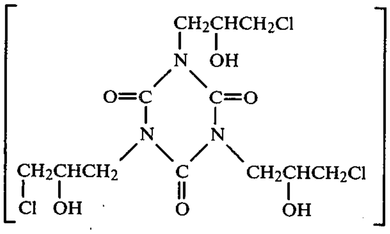

(i.e., precursor of triglycidyl isocyanurate) instead of the triglycidyl isocyanurate. A composition membrane was prepared from the polyaddition product in the same way as in Example 1. As initial properties, the membrane had a water flux of 173.4 $l/m^2 \cdot hr$ and a salt rejection of 93.2%.

What we claim is:

1. A permselective membrane having high water flux and perselectivity comprising a thin permselective film of a polymeric material, said polymeric material being prepared by cross-linking a polyaddition product between a polyepoxy compound and a polyamino compound having at least two amino groups capable of reacting with epoxy groups with a polyfunctional compound selected from the group consisting of aromatic, heterocyclic and alicyclic compounds containing at least two functional groups selected from acid halide, sulfonyl halide, isocyanate and acid anhydride groups.

2. The membrane of claim 1 wherein the polyaddition product contains hydroxyl groups resulting from the ring-opening of epoxy groups in a hydroxyl equivalent of at least 0.5 milliequivalent per gram of the polyaddition product.

3. The membrane of claim 1 or 2 wherein the polyaddition product has an amino equivalent of 1.0 to 40 milliequivalent per gram of the polyaddition product.

4. The membrane of claim 1 wherein the polyaddition product contains hydroxyl groups resulting from the ring-opening of epoxy groups in a hydroxyl equivalent of 1.0 to 15.0 milliequivalent per gram of the polyaddition product, and has an amino equivalent of 3.0 to 20.0 milliequivalent per gram of the polyaddition product.

5. The membrane of claim 1 wherein the polyepoxy compound is a compound having at least two glycidyl groups.

6. The membrane of claim 1 or 5 wherein the polyaddition product contains a structural moiety of the formula

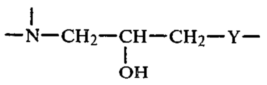 (I)

wherein Y represents —O— or

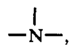

formed by the addition reaction between the epoxy groups of the polyepoxy compound and the amino groups of the polyamino compound in a hydroxyl equivalent of at least 0.5 milliequivalent per gram of the polyaddition product, and has an amino equivalent of 1.0 to 40 milliequivalents per gram of the polyaddition product.

7. The membrane of claim 1 or 5 wherein the polyaddition product contains a structural moiety of the formula

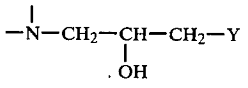

wherein Y represents —O— or

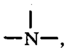

formed by the addition reaction between the epoxy groups of the polyepoxy compound and the amino groups of the polyamino compound in a hydroxyl equivalent of 1.0 to 15.0 milliequivalents per gram of the polyaddition product, and has an amino equivalent of 3.0 to 20.0 milliequivalents per gram of the polyaddition product.

8. The membrane of claim 1 wherein the polyaddition product has a water solubility of at least 0.5 g per 100 g of water.

9. The membrane of claim 1 wherein the polyaddition product has a water solubility of at least 1.0 g per 100 g of water.

10. The membrane of claim 1 wherein the polyaddition product is substantially free from unreacted epoxy groups.

11. The membrane of claim 1 wherein the polyepoxy compound has an epoxy equivalent of not more than 500.

12. The membrane of claim 1 wherein the polyepoxy compound has an expoy equivalent of 200 to 40.

13. The membrane of claim 1 wherein the polyepoxy compound is a polyepoxy compound expressed by the formula

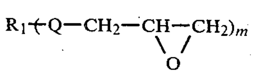 (II)

wherein Q represents an oxygen atom or a direct bond;

(a) when Q represents an oxygen atoms, $R_1$ represents a substituted or unsubstituted hydrocarbon group having a valence of m and up to 15 carbon atoms and optionally containing an ether linkage, and m is an integer of 2 to 4, and (b) when Q represents a direct bond $R_1$ is a group of the formula

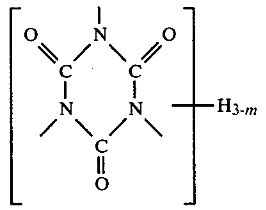

and m is 2 or 3, or $R_1$ is a group of the formula

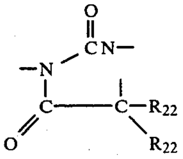

wherein $R_{22}$ represents a hydrogen atom or a methyl group, and m is 2.

14. The membrane of claim 13 wherein $R_1$ represents a hydrocarbon group having a valence of m and up to 15 carbon atoms which may contain an ether linkage and contains a hydroxyl and/or halomethyl group as a substituent.

15. The membrane of claim 13 wherein the polyepoxy compound is selected from the group consisting of glycerol diglycidyl ether, glycerol triglycidyl ether, trimethylolpropane diglycidyl ether, trimethylolpropane triglycidyl ether, sorbitol diglycidyl ether, sorbitol triglycidyl ether, sorbitol tetraglycidyl ether, phenylene diglycidyl ether, benzenetolyl triglycidyl ether, bisphenol A diglycidyl ether and mixtures of two or more of these.

16. The membrane of claim 13 wherein the polyepoxy compound is selected from the group consisting of diglycidyl isocyanurate, triglycidyl isocyanurate, N,N-diglycidyl hydantoin, N,N-diglycidyl-5,5-dimethyl hydantoin and mixtures of two or more of these.

17. The membrane of claim 13 wherein the polyepoxy compound of formula (II) is selected from polyepoxy compounds formed by condensation reaction between epihalohydrins and polyhydroxy compounds selected from ethylene glycol, propylene glycol, glycerol, trimethylolpropane, sorbitol, pentaerythritol, diglycerol, neopentyl glycol, resorcinol, hydroquinone, pyrogallol, 2,2-(4,4'-dihydroxy)diphenylpropane, 4,4'-dihydroxydiphenyl ether and 4,4'-dihyroxydiphenylmethane, and mixtures of two or more of these polyepoxy compounds.

18. The membrane of claim 1 wherein the polyexpoy compound is a mixture of triglycidyl isocyanurate and a polyepoxy compound of the formula

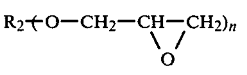

(III)

wherein $R_2$ represents a substituted or unsubstituted hydrocarbon group having a valence of n and up to 15 carbon atoms and optionally containing an ether linkage, and n is an integer of 2 to 4.

19. The membrane of claim 18 wherein the polyepoxy compound of formula (III) is selected from the group consisting of glycerol diglycidyl ether, glycerol triglycidyl ether, trimethylolpropane diglycidyl ether, trimethylolpropane triglycidyl ether, sorbitol diglycidyl ether, sorbitol triglycidyl ether, sorbitol tetraglycidyl ether, phenylene diglycidyl ether, benzenetolyl triglycidyl ether, bisphenol A diglycidyl ether, derivatives of these compounds resulting from the substitution of the whole or a part of their glycidyl groups and/or the hydrogen atoms of their hydroxyl groups by a $\beta$-halomethyl or $\beta$-glycidyloxyethyl group, and mixtures of two or more of these compounds.

20. The membrane of claim 18 wherein $R_2$ has at least one of —OH and —$CH_2Cl$ as a substituent.

21. The membrane of claim 1 wherein the polyamino compound has a molecular weight of not more than 1000.

22. The membrane of claim 1 wherein the polyamino compound has a molecular weight of 60 to 500.

23. The membrane of claim 1 wherein the polyamino compound has an amino equivalent of 10 to 35 milliequivalents per gram of the polyamino compound.

24. The membrane of claim 1 wherein the polyamino compound is a compound expressed by the formula

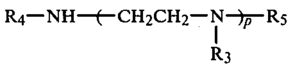

(IV)

wherein $R_3$ represents a hydrogen atom or the group —$CH_2CH_2$—$NH_2$, $R_4$ and $R_5$, independently from each other, represent a hydrogen atom or a lower alkyl group optionally substituted by a cyano or hydroxyl group, and p is a number of 2 to 10; the $R_3$ groups are the same or different; and when $R_5$ is a cyanoethyl group, $R_3$ represents a hydrogen atom.

25. The membrane of claim 1 wherein the ratio of the epoxy equivalent of the polyepoxy compound of the amino equivalent of the polyamino compound in the polyaddition product is from 1:1 to 1:6.

26. The membrane of claim 1 wherein the polyfunctional compound is a di- or tri-functional aromatic compound containing two or three functional groups selected from acid halide and sulfonyl halide groups.

27. The membrane of claim 26 wherein the di- or tri-functional aromatic compound is isophthaloyl chloride, terephthaloyl chloride, trimesoyl chloride or 3-chlorosulfonylisophthaloyl chloride.

28. The membrane of claim 26 wherein the microporous substrate is a polysulfone substrate.

29. The membrane of claim 1 wherein the polyfunctional compound is a trifunctional aromatic compound, or a mixture of a difunctional aromatic compound and a trifunctional aromatic compound.

30. The membrane of claim 1 which is in the form of a composite permselective membrane comprising a microporous substrate and said thin film formed on one surface of the microporous substrate.

31. The membrane of claim 1 wherein the thin film has a thickness of at least about 100 Å.

32. A process for producing a composite permselective membrane which comprises (a) treating a microporous substrate with a solution of a polyaddition product between a polyepoxy compound and a polyamino compound containing at least two amino groups capable of reacting with the epoxy groups, (b) contacting the treated microporous substrate with a solution of a polyfunctional compound selected from aromatic, heterocyclic and cyclic compounds containing at least two functional groups selected from the class consisting of acid halide, sulfonyl halide, isocyanate and acid anhydride groups, and (c) heating them to form a thin film of the cross-linked polyaddition product having permselectivity at one surface of the microporous substrate.

33. The process of claim 32 wherein the resulting composite membrane is coated with a water-soluble organic polymer.

34. The process of claim 33 wherein the water-soluble organic polymer is polyvinyl alcohol, polyvinyl pyrrolidone or polyvinyl methyl ether.

35. The membrane of claim 1 which is a reverse osmosis membrane.

36. The membrane of claim 6 wherein the polyaddition product contains an amino linkage from the polyamino compound in the backbone of the polyaddition product.

37. The membrane of claim 1 wherein the polyepoxy compound is triglycidyl isocyanurate or a mixture of triglycidyl isocyanurate and a polyepoxy compound of the formula $$R_2 \leftarrow O-CH_2-\underset{\diagdown O \diagup}{CH-CH_2})_n \qquad (III)$$

wherein $R_2$ represents a substituted or unsubstituted aliphatic hydrocarbon group having a valence of n and up to 15 carbon atoms and optionally containing an ether linkage and n is an integer of 2 to 4;

and the polyamino compound is a compound expressed by the formula $$R_4-NH \leftarrow CH_2CH_2-\underset{R_3}{\underset{|}{N}} \rightarrow_p R_5 \qquad (IV)$$

wherein $R_3$ represents a hydrogen atom or the group $-CH_2-CH_2-NH_2$, $R_4$ and $R_5$ represent a hydrogen atom and p is a number of 2 to 10;

and the functional compound is a difunctional aromatic compound containing two —COCl groups as functional groups.

38. The membrane of claim 37 wherein the polyfunctional compound is isophthaloyl chloride.

39. The membrane of claim 1 wherein the polyepoxy compound is an aliphatic polyepoxy compound or triglycidyl isocyanurate, or a mixture thereof with a polyepoxy compound of the formula $$R_2-(O-CH_2-\underset{\diagdown O \diagup}{CH-CH_2})_n$$

wherein $R_2$ represents a substituted or unsubstituted hydrocarbon having a valence or n and up to 15 carbon atoms and optionally containing an ether linkage, and n is an integer of 2 to 4;

and the polyamino compound is a compound expressed by the formula $$R_4-NH-(CH_2CH_2-\underset{R_3}{\underset{|}{N}}-)_p-R_5$$

wherein $R_3$ represents a hydrogen atom or the group $-CH_2-CH_2-NH_2$, $R_4$ and $R_5$ represent a hydrogen atom or a lower alkyl group substituted by a cyano group, and p is a number of 2 to 10;

and the polyfunctional compound is a trifunctional aromatic compound only or a mixture of a trifunctional aromatic compound and a difunctional aromatic compound, and the functional group of above functional compounds is selected from —COCl and $-SO_2Cl$.

40. The membrane of claim 39 wherein the polyepoxy compound is triglycidyl isocyanurate, or a mixture of triglycidyl isocyanurate and the polyepoxy compound of the formula (IV).

41. The membrane of claim 40 wherein $R_4$ and $R_5$ in formula (IV) are each hydrogen atoms.

42. In a method for desalination of saline or brackish water by reverse osmosis comprising contacting the saline or brackish water under pressure with a reverse osmosis membrane, the improvement wherein the membrane of claim 1 is used as the reverse osmosis membrane.

43. In a method for separating and removing tiny amounts of contaminate molecules dispersed or dissolved in a liquid by bringing the liquid into contact with a permselective membrane, the improvement wherein the membrane of claim 1 is used as the permselective membrane.

* * * * *

UNITED STATES PATENT AND TRADEMARK OFFICE

CERTIFICATE OF CORRECTION

PATENT NO. : 4,265,745

DATED : May 5, 1981

INVENTOR(S) : Kawaguchi et al.

It is certified that error appears in the above—identified patent and that said Letters Patent is hereby corrected as shown below:

IN THE CLAIMS:

Column 48, Claim 39, line 11, after "hydrocarbon" insert

-- group --

Column 45, Claim 13, line 1, delete "atoms" and insert

-- atom --

Column 45, Claim 13, line 22, change "CN—" to read

--     C     --
   —N   N —

Signed and Sealed this

*Eleventh* Day of *August 1981*

[SEAL]

*Attest:*

GERALD J. MOSSINGHOFF

*Attesting Officer* *Commissioner of Patents and Trademarks*